(12) United States Patent
Gates et al.

(10) Patent No.: US 8,620,919 B2
(45) Date of Patent: Dec. 31, 2013

(54) MEDIA ITEM CLUSTERING BASED ON SIMILARITY DATA

(75) Inventors: Patrick Gates, San Francisco, CA (US); Jeremy Werner, Burlingame, CA (US); Andrew H. Vyrros, San Francisco, CA (US); John Andrew McCulloh, Belmont, CA (US); Richard Frederick Wagner, San Francisco, CA (US); Eric Danforth Strahm, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/476,924

(22) Filed: May 21, 2012

(65) Prior Publication Data

US 2012/0233167 A1    Sep. 13, 2012

Related U.S. Application Data

(62) Division of application No. 12/646,916, filed on Dec. 23, 2009.

(60) Provisional application No. 61/240,630, filed on Sep. 8, 2009.

(51) Int. Cl.
*G06F 7/00* (2006.01)
*G06F 17/30* (2006.01)

(52) U.S. Cl.
USPC .......................................... 707/737; 707/738

(58) Field of Classification Search
USPC .......................................... 707/737, 738, 916
See application file for complete search history.

(56) References Cited

U.S. PATENT DOCUMENTS

| | | | |
|---|---|---|---|
| 4,607,385 | A | 8/1986 | Maeda |
| 4,996,642 | A | 2/1991 | Hey |
| 5,355,302 | A | 10/1994 | Martin |
| 5,375,235 | A | 12/1994 | Berry et al. |
| 5,464,946 | A | 11/1995 | Lewis |
| 5,483,278 | A | 1/1996 | Strubbe |
| 5,583,763 | A | 12/1996 | Atcheson et al. |

(Continued)

FOREIGN PATENT DOCUMENTS

| | | |
|---|---|---|
| EP | 0 643 359 A2 | 3/1995 |
| EP | 1050833 | 9/2000 |

(Continued)

OTHER PUBLICATIONS

IEEE, no matched results, Nov. 11, 2009, 1 page.

(Continued)

*Primary Examiner* — Mariela Reyes
(74) *Attorney, Agent, or Firm* — Novak Druce Connolly Bove + Quigg LLP

(57) ABSTRACT

Methods and arrangements for facilitating generation of media mixes for a program participant based at least in part on media library inventory information provided by a number of program participants. Those individuals that decide to be program participants are interested in organizing, maintaining and playing their music, based at least in part, on data derived from a population of other participants in the program. A program participant must send, and the system, receive, data representative of that program participant's media inventory. The system or program determines a relative similarity of each item from the collection of program participants as compared to each other item and from the similarity information clusters of similar items are identified. The clusters can be used to identify clusters of similar items in an individual program participant's media library and therefrom mixes of similar media items can be created.

24 Claims, 19 Drawing Sheets

(56) References Cited

U.S. PATENT DOCUMENTS

| | | |
|---|---|---|
| 5,616,876 A | 4/1997 | Cluts |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,835,087 A | 11/1998 | Herz et al. |
| 5,890,152 A | 3/1999 | Rapaport |
| 5,918,014 A | 6/1999 | Robinson |
| 5,926,624 A | 7/1999 | Katz et al. |
| 5,950,176 A | 9/1999 | Keiser |
| 6,000,044 A | 12/1999 | Chrysos et al. |
| 6,041,311 A | 3/2000 | Chislenko et al. |
| 6,047,311 A | 4/2000 | Ueno et al. |
| 6,112,186 A | 8/2000 | Bergh et al. |
| 6,134,532 A | 10/2000 | Lazarus et al. |
| 6,266,649 B1 | 7/2001 | Linden et al. |
| 6,289,353 B1 | 9/2001 | Hazlehurst et al. |
| 6,317,722 B1 | 11/2001 | Jacobi et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin |
| 6,430,539 B1 | 8/2002 | Lazarus et al. |
| 6,434,621 B1 | 8/2002 | Pezillo |
| 6,438,579 B1 | 8/2002 | Hosken |
| 6,487,539 B1 | 11/2002 | Aggarwal et al. |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinonhara |
| 6,687,696 B2 | 2/2004 | Hofmann et al. |
| 6,690,918 B2 | 2/2004 | Evans et al. |
| 6,704,576 B1 | 3/2004 | Brachman |
| 6,727,914 B1 | 4/2004 | Gutta |
| 6,748,395 B1 | 6/2004 | Picker et al. |
| 6,751,574 B2 | 6/2004 | Shinohara |
| 6,785,688 B2 | 8/2004 | Abajian et al. |
| 6,842,761 B2 | 1/2005 | Diamond et al. |
| 6,850,252 B1 | 2/2005 | Hoffberg |
| 6,865,546 B1 | 3/2005 | Song |
| 6,914,891 B2 | 7/2005 | Ha et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson |
| 7,024,424 B1 | 4/2006 | Platt et al. |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,117,516 B2 | 10/2006 | Khoo et al. |
| 7,120,619 B2 | 10/2006 | Drucker |
| 7,127,143 B2 | 10/2006 | Elkins, II |
| 7,133,924 B1 | 11/2006 | Rosenberg et al. |
| 7,136,866 B2 | 11/2006 | Springer, Jr. |
| 7,139,723 B2 | 11/2006 | Conkwright |
| 7,159,000 B2 | 1/2007 | Plastina et al. |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi et al. |
| 7,228,054 B2 | 6/2007 | Cowgill |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,296,031 B1 | 11/2007 | Platt et al. |
| 7,302,419 B2 | 11/2007 | Conkwright |
| 7,302,468 B2 | 11/2007 | Wijeratne |
| 7,340,455 B2 | 3/2008 | Platt et al. |
| 7,345,232 B2 | 3/2008 | Toivonen et al. |
| 7,358,434 B2 | 4/2008 | Plastina |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,852 B2 | 11/2008 | O'Rourke et al. |
| 7,457,862 B2 | 11/2008 | Hepworth et al. |
| 7,478,323 B2 | 1/2009 | Dowdy |
| 7,487,107 B2 | 2/2009 | Blanchard et al. |
| 7,490,775 B2 | 2/2009 | Biderman |
| 7,493,572 B2 | 2/2009 | Card |
| 7,499,630 B2 | 3/2009 | Koch |
| 7,505,959 B2 | 3/2009 | Kaiser et al. |
| 7,546,254 B2 | 6/2009 | Bednarek |
| 7,568,213 B2 | 7/2009 | Carhart |
| 7,571,121 B2 | 8/2009 | Bezos |
| 7,571,183 B2 | 8/2009 | Renshaw et al. |
| 7,574,422 B2 | 8/2009 | Guan |
| 7,574,513 B2 | 8/2009 | Dunning et al. |
| 7,580,932 B2 | 8/2009 | Plastina |
| 7,599,847 B2 | 10/2009 | Block |
| 7,599,906 B2 | 10/2009 | Kashiwagi |
| 7,599,950 B2 | 10/2009 | Walther |
| 7,644,077 B2 | 1/2010 | Picker et al. |
| 7,647,613 B2 | 1/2010 | Drakoulis |
| 7,650,570 B2 | 1/2010 | Torrens et al. |
| 7,653,761 B2 | 1/2010 | Juster et al. |
| 7,657,224 B2 | 2/2010 | Goldberg |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,693,887 B2 | 4/2010 | McLaughlin |
| 7,707,603 B2 | 4/2010 | Abanami |
| 7,720,871 B2 | 5/2010 | Rogers |
| 7,725,494 B2 | 5/2010 | Rogers |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller et al. |
| 7,801,758 B2 | 9/2010 | Gracie |
| 7,826,444 B2 | 11/2010 | Irvin |
| 7,831,199 B2 | 11/2010 | Ng |
| 7,840,570 B2 | 11/2010 | Cervera et al. |
| 7,853,712 B2 | 12/2010 | Amidon |
| 7,875,788 B2 | 1/2011 | Benyamin |
| 7,889,724 B2 | 2/2011 | Irvin |
| 8,260,656 B1 | 9/2012 | Harbick et al. |
| 2001/0007099 A1 | 7/2001 | Rau |
| 2001/0021914 A1 | 9/2001 | Jacobi |
| 2001/0056434 A1 | 12/2001 | Kaplan et al. |
| 2002/0002899 A1 | 1/2002 | Gjerdingen |
| 2002/0042912 A1 | 4/2002 | Lilima et al. |
| 2002/0045960 A1 | 4/2002 | Phillips et al. |
| 2002/0059094 A1 | 5/2002 | Hosea et al. |
| 2002/0082901 A1 | 6/2002 | Dunning et al. |
| 2002/0087970 A1 | 7/2002 | Dorricott et al. |
| 2002/0152117 A1 | 10/2002 | Cristofalo et al. |
| 2002/0178223 A1 | 11/2002 | Bushkin |
| 2002/0178276 A1 | 11/2002 | McCartney et al. |
| 2002/0194215 A1 | 12/2002 | Cantrell et al. |
| 2003/0018709 A1 | 1/2003 | Schrempp et al. |
| 2003/0022953 A1 | 1/2003 | Zampini et al. |
| 2003/0033321 A1 | 2/2003 | Schrempp et al. |
| 2003/0055689 A1 | 3/2003 | Block |
| 2003/0097379 A1 | 5/2003 | Ireton |

(56) References Cited

U.S. PATENT DOCUMENTS

| | | |
|---|---|---|
| 2003/0120630 A1 | 6/2003 | Tunkelang |
| 2003/0135513 A1 | 7/2003 | Quinn et al. |
| 2003/0212710 A1 | 11/2003 | Guy |
| 2003/0229537 A1 | 12/2003 | Dunning et al. |
| 2004/0002993 A1 | 1/2004 | Toussaint |
| 2004/0003392 A1 | 1/2004 | Trajkovic |
| 2004/0055445 A1 | 3/2004 | Iyoku et al. |
| 2004/0068552 A1 | 4/2004 | Kotz |
| 2004/0070538 A1 | 4/2004 | Horie et al. |
| 2004/0073924 A1 | 4/2004 | Pendakur |
| 2004/0128286 A1 | 7/2004 | Yasushita |
| 2004/0139064 A1 | 7/2004 | Chevallier et al. |
| 2004/0148424 A1 | 7/2004 | Berkson |
| 2004/0158860 A1 | 8/2004 | Crow |
| 2004/0162738 A1 | 8/2004 | Sanders et al. |
| 2004/0194128 A1 | 9/2004 | McIntyre |
| 2004/0215657 A1 | 10/2004 | Drucker et al. |
| 2004/0252604 A1 | 12/2004 | Johnson et al. |
| 2004/0254659 A1 | 12/2004 | Bolas et al. |
| 2004/0263337 A1 | 12/2004 | Terauchi et al. |
| 2004/0267715 A1 | 12/2004 | Polson et al. |
| 2005/0004941 A1 | 1/2005 | Kalker et al. |
| 2005/0021470 A1 | 1/2005 | Martin et al. |
| 2005/0038819 A1 | 2/2005 | Hicken et al. |
| 2005/0050079 A1 | 3/2005 | Plastina et al. |
| 2005/0060350 A1 | 3/2005 | Baum et al. |
| 2005/0075908 A1 | 4/2005 | Stevens |
| 2005/0091146 A1 | 4/2005 | Levinson |
| 2005/0091147 A1 | 4/2005 | Levinson et al. |
| 2005/0098023 A1 | 5/2005 | Toivonen et al. |
| 2005/0102610 A1 | 5/2005 | Jie |
| 2005/0114357 A1 | 5/2005 | Chengalvarayan |
| 2005/0131752 A1 | 6/2005 | Gracie |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210009 A1 | 9/2005 | Tran |
| 2005/0210101 A1 | 9/2005 | Janik |
| 2005/0210507 A1 | 9/2005 | Hawkins et al. |
| 2005/0216855 A1 | 9/2005 | Kopra et al. |
| 2005/0216859 A1 | 9/2005 | Paek |
| 2005/0222989 A1 | 10/2005 | Haveliwala |
| 2005/0223039 A1 | 10/2005 | Kim et al. |
| 2005/0234891 A1 | 10/2005 | Walther |
| 2005/0235811 A1 | 10/2005 | Dukane |
| 2005/0240494 A1 | 10/2005 | Cue et al. |
| 2005/0251440 A1 | 11/2005 | Bednarek |
| 2005/0256867 A1 | 11/2005 | Walther |
| 2005/0276570 A1 | 12/2005 | Reed, Jr. et al. |
| 2005/0278377 A1 | 12/2005 | Mirrashidi et al. |
| 2006/0015571 A1 | 1/2006 | Fukuda et al. |
| 2006/0015904 A1 | 1/2006 | Marcus |
| 2006/0018208 A1 | 1/2006 | Nathan |
| 2006/0018209 A1 | 1/2006 | Drakoulis |
| 2006/0020062 A1 | 1/2006 | Bloom |
| 2006/0020662 A1 | 1/2006 | Robinson |
| 2006/0026263 A1 | 2/2006 | Raghavan et al. |
| 2006/0032363 A1 | 2/2006 | Platt |
| 2006/0053077 A1 | 3/2006 | Mourad |
| 2006/0059225 A1 | 3/2006 | Stonehocker et al. |
| 2006/0062094 A1 | 3/2006 | Nathan |
| 2006/0067296 A1 | 3/2006 | Bershad |
| 2006/0074750 A1 | 4/2006 | Clark et al. |
| 2006/0080251 A1 | 4/2006 | Fried |
| 2006/0080356 A1 | 4/2006 | Burges et al. |
| 2006/0091203 A1 | 5/2006 | Bakker |
| 2006/0095516 A1 | 5/2006 | Wijeratne |
| 2006/0100978 A1 | 5/2006 | Heller |
| 2006/0107823 A1 | 5/2006 | Platt et al. |
| 2006/0112098 A1 | 5/2006 | Renshaw et al. |
| 2006/0123052 A1 | 6/2006 | Robbin |
| 2006/0136344 A1 | 6/2006 | Jones |
| 2006/0143236 A1 | 6/2006 | Wu |
| 2006/0153040 A1 | 7/2006 | Girish et al. |
| 2006/0155754 A1 | 7/2006 | Lubin et al. |
| 2006/0156239 A1 | 7/2006 | Jobs et al. |
| 2006/0165571 A1 | 7/2006 | Seon et al. |
| 2006/0168340 A1 | 7/2006 | Heller et al. |
| 2006/0168616 A1 | 7/2006 | Candelore |
| 2006/0171682 A1 | 8/2006 | Komano et al. |
| 2006/0173910 A1 | 8/2006 | McLaughlin |
| 2006/0173916 A1 | 8/2006 | Verbeck |
| 2006/0174008 A1 | 8/2006 | Abanami |
| 2006/0195462 A1 | 8/2006 | Rogers et al. |
| 2006/0195512 A1 | 8/2006 | Rogers |
| 2006/0195513 A1 | 8/2006 | Rogers |
| 2006/0195514 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New et al. |
| 2006/0195789 A1 | 8/2006 | Rogers |
| 2006/0195790 A1 | 8/2006 | Beaupre |
| 2006/0204220 A1 | 9/2006 | Lee |
| 2006/0206478 A1 | 9/2006 | Glaser et al. |
| 2006/0253874 A1 | 11/2006 | Stark et al. |
| 2006/0265421 A1 | 11/2006 | Ranasinghe |
| 2006/0277098 A1 | 12/2006 | Chung et al. |
| 2006/0282304 A1 | 12/2006 | Bedard et al. |
| 2006/0282311 A1 | 12/2006 | Jiang |
| 2006/0288367 A1 | 12/2006 | Swix et al. |
| 2007/0016507 A1 | 1/2007 | Tzara |
| 2007/0043829 A1 | 2/2007 | Dua |
| 2007/0073596 A1 | 3/2007 | Alexander et al. |
| 2007/0100690 A1 | 5/2007 | Hopkins |
| 2007/0101373 A1 | 5/2007 | Bodlaender |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0161402 A1 | 7/2007 | Ng |
| 2007/0162546 A1 | 7/2007 | McLaughlin |
| 2007/0174866 A1 | 7/2007 | Brown et al. |
| 2007/0183742 A1 | 8/2007 | Cowgill |
| 2007/0203790 A1 | 8/2007 | Torrens |
| 2007/0219996 A1 | 9/2007 | Jarvinen |
| 2007/0220566 A1 | 9/2007 | Ahmad-Taylor |
| 2007/0244880 A1 | 10/2007 | Martin |
| 2007/0250429 A1 | 10/2007 | Walser |
| 2007/0250761 A1 | 10/2007 | Bradley et al. |
| 2007/0265979 A1 | 11/2007 | Hangartner |
| 2007/0271286 A1 | 11/2007 | Purang |
| 2007/0271287 A1 | 11/2007 | Acharya et al. |
| 2007/0294096 A1 | 12/2007 | Randall |
| 2008/0004948 A1 | 1/2008 | Flake |
| 2008/0004990 A1 | 1/2008 | Flake |
| 2008/0010266 A1 | 1/2008 | Brunn et al. |
| 2008/0021851 A1 | 1/2008 | Alcalde et al. ............ 706/21 |
| 2008/0027881 A1 | 1/2008 | Bisse |
| 2008/0033979 A1 | 2/2008 | Vignoli et al. |
| 2008/0040326 A1 | 2/2008 | Chang et al. |
| 2008/0046317 A1 | 2/2008 | Christianson |
| 2008/0065659 A1 | 3/2008 | Watanabe et al. |
| 2008/0077264 A1 | 3/2008 | Irvin et al. |
| 2008/0082467 A1 | 4/2008 | Meijer |
| 2008/0091717 A1 | 4/2008 | Garbow et al. |
| 2008/0109378 A1 | 5/2008 | Papadimitriou |
| 2008/0115173 A1 | 5/2008 | Ellis et al. |
| 2008/0120339 A1 | 5/2008 | Guan et al. |
| 2008/0126384 A1 | 5/2008 | Toms et al. |
| 2008/0133593 A1 | 6/2008 | Clark |
| 2008/0133601 A1 | 6/2008 | Cervera |
| 2008/0133737 A1 | 6/2008 | Fischer et al. |
| 2008/0154942 A1 | 6/2008 | Tsai et al. |
| 2008/0155057 A1 | 6/2008 | Khedouri |
| 2008/0155588 A1 | 6/2008 | Roberts et al. |
| 2008/0168059 A1 | 7/2008 | Hoashi et al. |
| 2008/0195438 A1 | 8/2008 | Manfredi |
| 2008/0215173 A1 | 9/2008 | Hicken |
| 2008/0220855 A1 | 9/2008 | Chen |

(56) References Cited

U.S. PATENT DOCUMENTS

| | | |
|---|---|---|
| 2008/0256106 A1 | 10/2008 | Whitman |
| 2008/0270221 A1 | 10/2008 | Clemens |
| 2009/0006353 A1 | 1/2009 | Vignoli et al. .......... 707/5 |
| 2009/0024504 A1 | 1/2009 | Lerman |
| 2009/0024510 A1 | 1/2009 | Chen |
| 2009/0043811 A1 | 2/2009 | Yamamoto et al. |
| 2009/0048957 A1 | 2/2009 | Celano |
| 2009/0070267 A9 | 3/2009 | Hangartner |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera et al. |
| 2009/0089222 A1 | 4/2009 | Ferreira |
| 2009/0106085 A1 | 4/2009 | Raimbeault |
| 2009/0164641 A1 | 6/2009 | Rogers |
| 2009/0210415 A1 | 8/2009 | Martin et al. |
| 2009/0276368 A1 | 11/2009 | Martin |
| 2010/0161595 A1 | 6/2010 | Martin |
| 2010/0169328 A1 | 7/2010 | Hangartner |
| 2011/0119127 A1 | 5/2011 | Hangartner |

FOREIGN PATENT DOCUMENTS

| | | |
|---|---|---|
| EP | 1231788 | 8/2002 |
| EP | 1420388 | 5/2004 |
| EP | 1548741 | 6/2005 |
| EP | 1906320 A1 | 4/2008 |
| EP | 2161668 A1 | 3/2010 |
| EP | 2306344 A1 | 4/2011 |
| JP | 11052965 | 2/1999 |
| JP | 2002108351 | 4/2002 |
| JP | 2002320203 | 10/2002 |
| JP | 2003255958 | 9/2003 |
| JP | 2004221999 | 8/2004 |
| JP | 2005027337 | 1/2005 |
| KR | 2002025579 | 4/2002 |
| WO | WO 00/17793 A1 | 3/2000 |
| WO | WO 03/019560 A3 | 3/2003 |
| WO | 03/036541 | 5/2003 |
| WO | 03/051051 | 6/2003 |
| WO | 2004/070538 | 8/2004 |
| WO | 2005/013114 | 2/2005 |
| WO | WO 2005/038666 A1 | 4/2005 |
| WO | WO 2005/046252 A3 | 5/2005 |
| WO | 2005/115107 | 12/2005 |
| WO | WO 2006/040710 A1 | 4/2006 |
| WO | 2006/052837 | 5/2006 |
| WO | 2006/075032 | 7/2006 |
| WO | WO 2006/096664 A2 | 9/2006 |
| WO | WO 2006/097795 A3 | 9/2006 |
| WO | 2006/114451 | 11/2006 |
| WO | 2007/038806 | 4/2007 |
| WO | 2007/075622 | 7/2007 |
| WO | 2007/092053 | 8/2007 |
| WO | WO 2007/092053 A1 | 8/2007 |
| WO | 2007/134193 | 11/2007 |
| WO | 2009/149046 | 12/2009 |

OTHER PUBLICATIONS

Industry Standard, The, Help FAQs for Standard Prediction Market, http://www.thestandard.com/help, downloaded Jun. 29, 2009.
"Communications of the ACM" Dec. 1992, vol. 35, No. 12 at pp. 26-28 (Introduction to special issue regarding Workshop on High Performance Information Filtering, Morristown, N.J. Nov. 1991)., Dec. 1992, 26-28.
"Architecting Personalized Delivery of Multimedia Information",
"Architecting Personalized Delivery of Multimedia Information", Communications of the ACM (Dec. 1992).
"Non-Final Office Action dated Feb. 9, 2012", U.S. Appl. No. 12/646,916 (13 pages).
"Social Networking Meets Music Listening: Mecora Launches Radio 2.0," www.masternewmedia.orgfnewsf2006f04f13f IB,M.! social_networking_meets_music_listening.htm, Apr. 13, 2006.

Canada—Examiner's Report for App. No. 2713507 mailed on Sep. 21, 2011.
International Search Report PCT/US2009/051233; Sep. 4, 2009; Strands, Inc. (Sited in 61692-76).
Pachet, Francois, A Taxonomy of Musical Genres, Content-Based Multimedia Information Access Conference (RIAO), Paris, Apr. 2000, 8 pages.
PCT/ES2005/00003 Written Opinion of the International Preliminary Examining Authority dated Mar. 19, 2007.
PCT/ES2005/00003 Written Opinion of the International Searching Authority Report dated Jun. 10, 2005.
PCT/US09/42002; Filed Apr. 28, 2009; International Search Report and Written Opinion; Jun. 2009.
PCT/US09/45911; Filed Jun. 2, 2009; International Search Report and Written Opinion.
PCT/US09/68604 International Search Report and Written Opinion of the International Searching Authority; dated Feb. 17, 2010.
PCT/US2005/000213 Written Opinion of the International Searching Authority dated Jan. 12, 2006.
PCT/US2006/004257 European Search Report Oct. 23, 2009.
PCT/US2009/45725; International Search Report_WO; Jul. 15, 2009.
PCT/ES2005/00003 International Preliminary Report on Patentability (Ch II) Report dated May 22, 2007.
PCT/ES2005/000213 International Preliminary Report on Patentability (Ch II) Report Dated Nov. 15, 2007.
PCT/US2006/003795; International Search Report and Written Opinion of International Application, dated May 28, 2008.
Smart Computing, "The Scoop on File-Sharing Services," Dec. 2000, vol. 11, Issue 12; pp. 30-33 in printed issue. Available at www.smartcomputing.com/editorial/article.
asp?article=articles%2F2000%Fs1112%2F08s12.asp.
Trustees of Indiana University, Variations2, The Indiana University Digital Music Library, http://dmi.indiana.edu/, last updated May 11, 2005.
UK Search Examination Report, App. No. GB1014954.0, mailed Dec. 16, 2010.
www.akoo.com/Akoo/, Web Page, AKOO, Pick the Music, Waiting in the line at the Theme Park, Introducing the m-Venue™ platform.
www.alwayson-network.com/comments.php?id=P12663 0 37 0 C, Web Page, Not Your Average Jukebox, On Hollywood 1000 contender Ecast uses broadband to being the digital media experience to your watering hole.
www.ecastinc.com/music_licensing.html, Web Page, Ecast Network, interactive entertainment network, Music/Licensing.
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—BOSE.
"New Music Recommendation System is Based on FOAF Personal Profiling," www.masternewmedia.org/music_recommendationfmusic_recommendation_system_FOAF, Oct. 1, 2005.
PCT/US07/068708; Filed May 10, 2007; International Search Report and Written Opinion; WO 2007/134193; Dec. 7, 2007.
www.axcessnews.com/modules/wfsection/article.
php?articleid=8327,Web Page, Feb. 24, 2006, Maintenance Fees, Digital Music Sales Triple to $1.1 Billion in 2005., Feb. 24, 2006.
PCT/US2006/034218; USPTO Search Authority; PCT International. Search Report; Feb. 9, 2007.
PCT/US2006/048330; International Bureau; PCT Search Report and Written Opinion; Mar. 20, 2008; 10 pages.
www.bmi.com/news/200403/20040324b.asp, Web Page, BMI™ Figures Don't Lie, Mar. 24, 2004, Touch Tunes Signs License Agreement for BMI Music in Digital Jukeboxes.
PCT/US06/38769; International Search Report; Mar. 25, 2008.
Treemap, University of Maryland, http://www.cs.umd.edu/hcil/treemap/ , last updated Aug. 5, 2003, 4 pages.
www.rfidjournal.com/article/articleview/1619/1/1, Web Page, RFID brings messages to Seattle side walks on RFI D system being deployed next week will send marketing and assistive information to users carrying active RFID tags. RFID Journal (pp. 1-4).

(56) References Cited

OTHER PUBLICATIONS

"Apple: iTunes 4.2 User Guide for Windows", Apple: iTunes 4.2 User Guide for Windows; Dec. 2003; retrieved from the internet: URL: http://www2.austin.cc.tx. us/tcm/projects/itunes.pdf; pp. 10, 17-19. (Added Ref Nov. 5, 2009), Dec. 2003, 10,17-19.
"Communication from the Examining Division dated Jul. 22, 2011", European Patent Application No. 09169573.4 (8 pages).
"Final Office Action dated Jan. 1, 2012", U.S. Appl. No. 12/242,728 (15 pages).
"Final Office Action dated Nov. 10, 2011", U.S. Appl. No. 12/242,768 (10 pages).
"Lessons from LyricTimeTM: A Prototype Multimedia System", "Lessons from LyricTimeTM: A Prototype Multimedia System" 4th IEEE ComSoc International Workshop on Multimedia Communications (Apr. 1992).
"Non-Final Office Action dated Feb. 16, 2012", U.S. Appl. No. 12/242,758.
"Non-Final Office Action dated Jan. 9, 2012", U.S. Appl. No. 12/242,735 (12 pages).
Alvear, Jose , ""Risk-Free Trial Streaming Media Delivery Tools,"", Alvear, Jose, "Risk-Free Trial Streaming Media Delivery Tools," Streaming Media.com; www.streamingmedia.com/ article. ap?id=5768, Jun. 30, 2000.
Baluja, S et al., ""Video Suggestion and Discovery for YouTube: Taking Random Walks Through the View Graph"", S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World, 2008, 895-904.
Belkins, et al., ""Information Filtering and Information Retrieval: Two Sides of the Same Coin?"", Belkins, et al., "Information Filtering and Information Retrieval: Two Sides of the Same Coin?", Communications of the ACM (Dec. 1992).
Bender, et al., ""Newspace: Mass Media and Personal Computing,"", Bender, et al., "Newspace: Mass Media and Personal Computing," Proceedings of USENIX, Conference, pp. 329-348 (Summer 1991)., 329-348.
Bender, , ""Twenty Years of Personalization: All about the Daily Me,"", Bender, "Twenty Years of Personalization: All about the Daily Me," Educause Review (Sep./Oct. 2002).
Bollen, Johan et al., Toward alternative metrics of journal impact: a comparison of download and citation data, Johan Bollen, Herbert Van de Sompel, Joan Smith, Rick Luce, Google.com, 2005, pp. 1-2, 2005.
Bunzel, Tom , Tom Bunzel, "Easy Digital Music," QUE Publisher, Aug. 18, 2004, Chapters 5 and 8.
Cano, Pedro et al., "On the Use of FastMap for Audio Retrieval and Browsing", Cano, Pedro et al., On the Use of FastMap for Audio Retrieval and Browsing, The International Conference on Music Information Retrieval and Related Activities (ISMIR 2002), Paris, France, Oct. 2002,2 pages., 2002.
Carlson, et al., "Internet Banking Market Developments and Regulatory Issues in the New Economy: What Changed, and the Challenges for Economic Policy . . . ", Carlson et al. "Internet Banking Market Developments and Regulatory Issues in the New Economy: What Changed, and the Challenges for Economic Policy . . . "; May 2001; htlp:l/www.occ.gov/netbankiSGEC2000.pdf., May 2001.
Chao-Ming, et al., "Design and Evaluation and mProducer: a Mobile Authoring Tool for Personal Experience Computing", Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/vie, [http://citeseerx.ist. psu.edu/viewdoc/download?doi=10.1.1.131.2933&rep=rep1 &type=pdf], Oct. 27-29, 2004.
Connell, Lain et al., "Ontological Sketch Models: Highlighting User-System Misfits", Connell, Iain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16., Sep. 2003, 1-16.

Das, A et al., ""Google News Personalization: Scalable Online Collaborative Filtering"", A. Das, M. Datar, A. Garg, and S. Rajaram. "Google News Personalization: Scalable Online Collaborative Filtering". In WWW'07: Proceedings of the 16th international conference on World Wide Web, pp. 271-280, New York, NY, USA, 2007. ACM Press., 2007, 271-280.
Dean, J et al., ""MapReduce: Simplified Data Processing on Large Clusters"", Dean, J. and Ghemawat, S. "MapReduce: Simplied Data Processing on Large Clusters". Commun. ACM, 51(1):107-113, 2008., 107-113.
Dempster, Y et al., ""Maximum Likelihood from Incomplete Data via the EM Algorithm"", Y. Dempster, N. Laird, and D. Rubin. "Maximum Likelihood from Incomplete Data via the EM Algorithm". Jour. of the Royal Stat. Soc., Ser. B., 39:1047-1053, 1977, 1047-1053.
Deshpande, Mukund et al., "Item-Based Top-N Recommendation Algorithms", Deshpande, Mukund, et al., "Item-Based Top-N Recommendation Algorithms," ACM Transactions on Information Systems, 22:1 (Jan. 2004), pp. 143-177.
Hofmann, T , ""Latent Semantic Models for Collaborative Filtering"", T. Hofmann. "Latent Semantic Models for Collaborative Filtering". ACM Transactions on Information Systems, 22:89-115, 2004., 89-115.
Hofmann, T , ""Unsupervised Learning by Probabilistic Latent Semantic Analysis"", T. Hofmann. "Unsupervised Learning by Probabilistic Latent Semantic Analysis". Mach. Learn., 42:177-196, 2001., 177-196.
Indyk, P. et al., ""Low-Distortion Embeddings of Finite Metric Spaces".", Indyk, P. and Matousek, J. "Low-Distortion Embeddings of Finite Metric Spaces". In Handbook of Discrete and Computational Geometry, pp. 177-196. CRC Press, 2004., 177-196.
Jacucci, Giulio et al., "IP City, Integrated Project on Interaction and Presence on Urban Environments-Demonstrators on Large-Scale Events Applications", IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007., 1-37.
Lazar, N A. , "Bayesian Empirical Likelihood", N.A. Lazar; Bayesian Empirical Likelihood; Technical Report, Carnegi Mellon University, Department of Statistics, 2000; 26 pages., 2000.
Lie, "The Electronic Broadsheet—All the News That Fits the Display", Lie, "The Electronic Broadsheet—All the News That Fits the Display," MIT Master's Thesis, pp. 1-96 (Jun. 1991)., 1-96.
Lippman, et al., "News and Movies in the 50 Megabit Living Room", Lippman, et al., "News and Movies in the 50 Megabit Living Room," IEEE/IEICE, Global Telecommunications Conference, pp. 1976-1981 (Nov. 15, 1987)., 1976-1981.
Loeb, Shoshana , "Delivering Interactive Multimedia Documents over Networks", Delivering Interactive Multimedia Documents over Networks; Shoshana Loeb; IEEE Communications Magazine; May 1992; 8 pages.
Logan, Beth , "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955., Aug. 2001, 952-955.
Logan, Beth , "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002,2 pages., Oct. 2002.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000,4 pages.
McCarthy, et al., "Augmenting the Social Space of an Academic Conference", Augmenting the Social Space of an Academic Conference; McCarthy, et al. Information School, University of Washington and Department of Computer Science and Engineering, University of Minnesota; pp. 1-10; Nov. 6-10, 2004., 1-10.
Australia Examiner's 1st Report on patent application No. 2010212503 mailed Jun. 27, 2011.
EP Search, App. No. EP 10175868.8, dated Dec. 21, 2010.

(56) References Cited

OTHER PUBLICATIONS

"PCT/US 10/47955 International Search Report", PCT/US 10/47955 International Search Report mailed Nov. 8, 2010.
Notess, Mark et al., Notess, Mark et al., Variations2: Toward Visual Interface for Digital Music Libraries, Second International Workshop on Visual Interfaces to Digital Libraries, 2002, 6 pages.
O'Connor, M , PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218., 2001, 199-218.
Orwant, J , "Appraising the User of User Models: Doppelganger's Interface", Jon Orwant, "Appraising the User of User Models: Doppelganger's Interface," in: A. Kobsa and D. Litman (eds.), Proceeding of the 4th International Conference on User Modeling (1994).
Orwant, Jonathon L. , "Doppelganger Goes to School: Machine Learning for User Modeling", Jonathan L. Orwant, "Doppelganger Goes to School: Machine Learning for User Modeling," MIT Master of Science Thesis (Sep. 1993).
Orwant, Jonathon L. , "Doppelganger: A User Modeling System", Jonathan L. Orwant, "Doppelganger: A User Modeling System," MIT Bachelor's Thesis (Jun. 1991).
Paek, Tim et al., Toward University Mobile Interaction for Shared Displays; Tim Paek, et al.; Microsoft Research, Redmond, WA; pp. 1-4; Nov. 6-10, 2004., 1-4.
Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579., 570-579.
Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002,9 pages.
Platt, John C. et al., "Learning a Gaussian Process Prior for Automatically Generating Music Playlists", Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9., 1-9.
Platt, John S. , "Fasting Embedding of Sparse Music Similarity Graphs", Platt, John S., "Fasting Embedding of Sparse Music Similarity Graphs," Microsoft Corporation, {jplatt@microsoft.com}; 2004.
Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210., 193-210.
Rudstrom, Asa , "Co-Construction of Hybrid Spaces", Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and, Royal Institute of Technology; pp. 1-69; Nov. 2005, 1-69.
Scheible, Jurgen et al., "MobiLenin—Combining a Multi-Track Music Video, Personal Mobile Phones and a Public Display into Multi-User", MobiLenin—Combining a Multi-Track Music Video, Personal Mobile Phones and a Public Display into Multi-User 3 Interactive Entertainment; Jurgen Scheible, et al. Media Lab, University of Art and Design, Helsinki, Finland; pp. 1-10; Nov. 6-10, 2005., pp. 1-10.
Scihira, I , "A Characterization of Singular Graphs", Scihira, I. "A Characterization of Singular Graphs". Electronic Journal of Linear Algebra, 16:451-462,2007., 451-462.
Shneiderman, Ben , "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99., pp. 92-99.
Shneiderman, Ben , "Treemaps for Space-Contrained Visualization of Hierarchies", Shneiderman, Ben, Treemaps for Space-Contrained Visualization of Hierarchies, http://www.sc.umd.edu/heil/treemap-history, last updated Apr. 28, 2006, 16 pages.
Strands Business Solutions, , "Integration Document v.2.0", Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages., May 2008.
Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37, 1-37.
Thompson, John , "A Graphic Representation of Interaction With the NEXIS News Database", John Thompson, "A Graphic Representation of Interaction With the NEXIS News Database," MIT Thesis (May 1983).
Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
Wolfers, et al., Wolfers, Justin and Zitzewitz, Eric, Prediction Markets, Journal of Economic Perspectives, Spring 2004, pp. 107-126, vol. 18, No. 2., 107-126.
Yates, Alexander et al., "ShopSmart; Product Recommendations through Technical Specifications and User Reviews", ShopSmart: Product Recommendations through Technical Specifications and User Reviews; Alexander Yates et al. Temple University; CIKM; Oct. 26-30, 2008, Napa Valley, CA, USA; 2 pages.
Yen, Yi-Wyn , Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.
Canada Examiner's Report mailed Sep. 21, 2011, App. No. 2713507, filed Aug. 26, 2010, titled, "Media Item Clustering Based on Similarity Data", 3 pages.
UK Search and Examination Report mailed Dec. 16, 2010, App. No. GB1014954.0, filed Sep. 8, 2010, titled, "Media Item Clustering Based on Similarity Data", 10 pages.
Australia Examiner's First Report mailed Jun. 27, 2011, App. No. AU2010212503, filed Aug. 23, 2010, titled, "Media Item Clustering Based on Similarity Data", 3 pages.
Extended European Search Report mailed Dec. 21, 2010, App. No. 10175868.8 filed Sep. 8, 2010, titled, "Media Item Clustering Based on Similarity Data", 6 pages.
PCT International Search Report and Written Opinion mailed Nov. 8, 2010, App No. PCT/US2010/047955, filed Sep. 7, 2010, titled, "Media Item Clustering Based on Similarity Data", 16 pages.
Office Action mailed on Mar. 8, 2011 for U.S. Appl. No. 12/242,728 (Pub No. US 2010/0076982 A1), titled "System and Method for Playlist Generation Based on Similarity Data" to Patrick Gates et al.
Office Action mailed on Aug. 16, 2011 for U.S. Appl. No. 12/242,728 (Pub No. US 2010/0076982 A1), titled "System and Method for Playlist Generation Based on Similarity Data" to Patrick Gates et al.
Office Action mailed on Jan. 10, 2012 for U.S. Appl. No. 12/242,728 (Pub No. US 2010/0076982 A1), titled "System and Method for Playlist Generation Based on Similarity Data" to Patrick Gates et al.
Office Action mailed on Jan. 9, 2012 for U.S. Appl. No. 12/242,735 (Pub No. US 2010/0070917 A1), titled "System and Method for Playlist Generation Based on Similarity Data" to Patrick Gates et al.
Office Action mailed on Feb. 4, 2011 for U.S. Appl. No. 12/242,758 (Pub No. US 2010/0076983 A1), titled "System and Method for Playlist Generation Based on Similarity Data" to Patrick Gates et al.
Office Action mailed on Jul. 11, 2011 for U.S. Appl. No. 12/242,758 (Pub No. US 2010/0076983 A1), titled "System and Method for Playlist Generation Based on Similarity Data" to Patrick Gates et al.
Office Action mailed on May 24, 2011 for U.S. Appl. No. 12/242,768 (Pub No. US 2010/0076958 A1), titled "System and Method for Playlist Generation Based on Similarity Data" to Patrick Gates et al.

(56) References Cited

OTHER PUBLICATIONS

Office Action mailed on Nov. 10, 2011 for U.S. Appl. No. 12/242,768 (Pub No. US 2010/0076958 A1), titled "System and Method for Playlist Generation Based on Similarity Data" to Patrick Gates et al.

J.M. Buldú, P. Cano, M. Koppenberger, J. A. Almendral and S. Boccaletti, "The complex network of musical tastes," New Journal of Physics, vol. 9, No. 6, Jun. 2007, p. 172, IOP Publishing Ltd., Bristol, United Kingdom and Deutsche Physikalische Gesellschaft.

Andreja Andric and Goffredo Haus, "Estimating Quality of Playlists by Sight," AXMEDIS'05, IEEE Computer Society Washington, DC, 2005.

Michel Crampes et al., "Automatic Playlist Composition in a Dynamic Music Landscape," SADPI'07, May 21-22, 2007, Montpellier, France, vol. 259, pp. 15-20.

R. Ragno et al., "Inferring Similarity Between Music Objects with Application to Playlist Generation," MIR'05, Nov. 10-11, 2005, Singapore, pp. 73-80.

Arto Lehtiniemi and Jarno Seppänen, "Evaluation of Automatic Mobile Playlist Generator," IS-CHI 2007: Mobile devices and services, 2007, pp. 452-459.

Steffen Pauws and Berry Eggen, "Realization and User Evaluation of an Automatic Playlist Generator," Journal of New Music Research, 2003, vol. 32, No. 2, pp. 179-192.

M. Adcock et al., "AreWeThereYet?—A Temporally Aware Media Player," In Proc. 9th Australasian User Interface Conference (AUIC 2008), Wollongong, Aug. 2008, pp. 29-32.

Tuck Wah Leong et al., "Randomness as a Resource for Design," Proceedings of the 6th conference on Designing Interactive systems, 2006, University Park, PA, pp. 132-139.

Yoshinori Hijikata et al.,"Content-based Music Filtering System with Editable User Profile," Proc. of the 2006 ACM Symposium on Applied Computing, Dijon, France, pp. 1050-1057.

Elias Pampalk, Arthur Flexer and Gerhard Widmer, "Improvements of Audio-Based Music Similarity and Genre Classificaton," in Proceedings of 6th International Conference on Music Information Retrieval (ISMIR'05), pp. 628-633, London, UK, Sep. 2005.

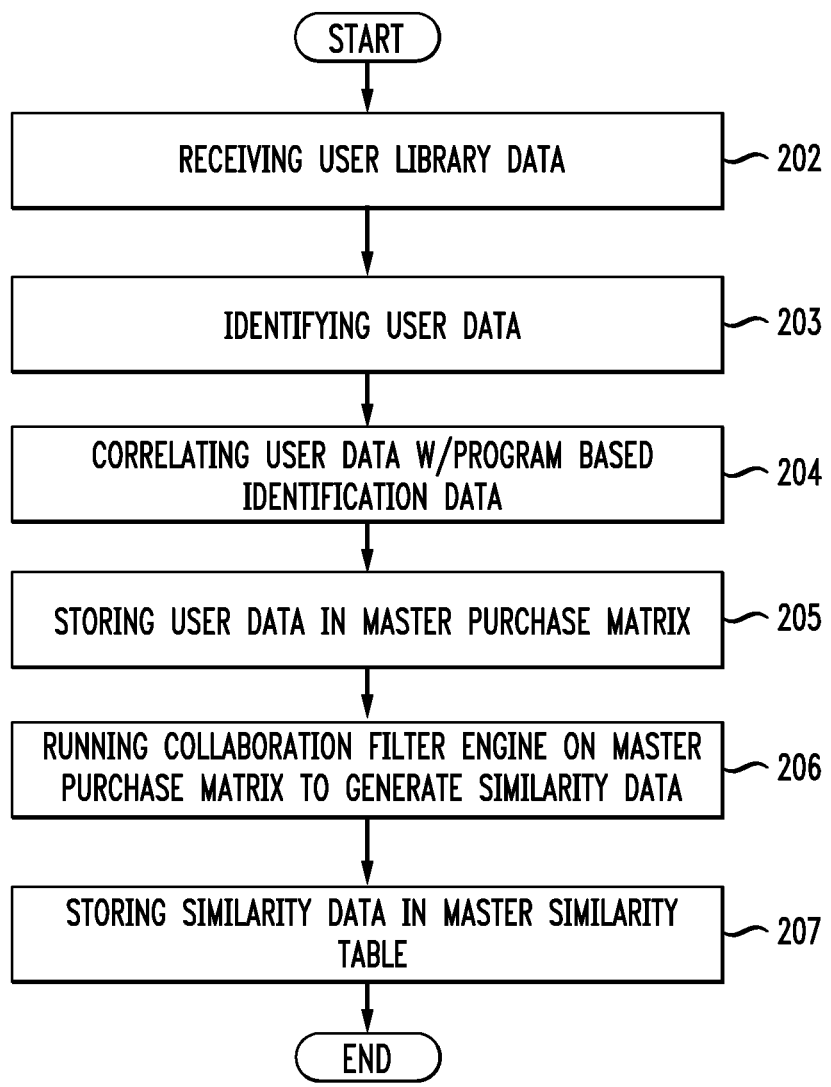

|        | 1 | 2 | 3 | 4 | 5 | 6 | 7 |
|--------|---|---|---|---|---|---|---|
| 23678  | X |   |   | X |   |   |   |
| 567890 |   |   |   |   |   |   | X | ← 408
| 067326 |   |   | X |   |   |   |   | ← 410
| 76320  |   |   |   |   |   |   |   |
| 121260 | X |   |   |   |   |   |   |
| ○○○    |   |   |   |   | X | X |   |
| ○○○    |   |   |   |   |   |   |   |
| ○○○    | X |   |   |   |   |   | X |
| ○○○    | X | X |   | X |   |   |   |

406 ⎯ 121260

402 ⎯ PURCHASE MATRIX

FIG. 5          502

| PROGRAM BASED MEDIA ID | 17 | ⎯ 504 |
| EQUIVALENT MEDIA | (39, 92, 255) | ⎯ 506 |
| CORRELATED MEDIA | 12<br>100<br>312 | ⎯ 508 |

ITEM 1 <1, 25, 86, 99, 5, 15, 30>

ITEM 2 <2, 25, 31, 16, 30, 86, 99>

ITEM 25 <25, 1, 2, 16, 5, 86, 99>

— 1050

| ITEM | SCORE 1 | SCORE 2 | SCORE 3 | TOTAL |
|---|---|---|---|---|
| 1 | 100 | | 99 | 199 |
| 2 | | 100 | 98 | 198 |
| 5 | 96 | | 96 | 192 |
| 15 | 95 | | | 95 |
| 16 | | 97 | 97 | 194 |
| 25 | 99 | 99 | 100 | 298 |
| 30 | 94 | 96 | | 190 |
| 31 | | 98 | | 98 |
| 86 | 98 | 95 | 95 | 288 |
| 99 | 97 | 94 | 94 | 285 |

— 1052

CLUSTER VECTOR (CENTROID) <25, 86, 99, 1, 2, 16, 5, 30, 31, 15> — 1054

MEDIA ITEM CLUSTERING BASED ON SIMILARITY DATA

CROSS REFERENCE TO RELATED APPLICATIONS

This application is a divisional of U.S. patent application Ser. No. 12/646,916, filed on Dec. 23, 2009, which claims the benefit of U.S. Provisional Patent Application No. 61/240,630, entitled "MEDIA ITEM CLUSTERING BASED ON SIMILARITY DATA", filed on Sep. 8, 2009, both of which are hereby expressly incorporated herein by reference in their entireties.

BACKGROUND

1. Technical Field

The present disclosure relates to clusters of media items and more specifically to generating media mixes based on clusters of media items.

2. Introduction

Before the age of compressed media files such as MPEG, ACC, WMA media was stored on magnetic tapes and later compact discs (CDs). Especially with reference to music media files, consumers typically bought music media as albums comprising several music tracks. Frequently these albums contained tracks which a listener would associate with varying degrees of enjoyment, either because of the suitability of the individual track to the listener's tastes or the listener's present listening mood.

This frequently led to the situation where the tracks a listener would like to listen to were scattered over several or even many albums. Motivated by this situation, user's commonly created "mixes" of their favorite audio tracks or "mixes" of audio tracks that were similar and therefore sounded great when played together on the same tape or compact disc.

To create these mixes, users had to have great knowledge of all of the tracks in their collection. Further users had to record each track from its original media onto another media. Often user's spent hours listening to tracks to determine which tracks could fit on the limited space of a tape or CD and to determine the order.

Today many media consumers buy individual tracks rather than buy complete albums. Also users today often listen to a greater number of tracks in their library since their entire collection can fit on one device instead of many tapes or CDs.

Despite this relative convenience of having access to every track in their media library at any time and being able to access each track with a scroll and a click, listener's still create mixes of tracks, often in the form of playlists. However, creating these mixes is still time consuming processes requiring a great deal of user interaction and many user decisions. Accordingly there is a need to eliminate the burden on the listener while still creating high quality mixes.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for identifying clusters of media items in a program participant's media library for use in creating mixes of media items. To create the highest quality mixes, the clusters are based on the input of an entire population of users.

A population of program participants all share information about the contents of the individual media items in their music libraries with a server hosting the program in exchange for receiving clustering data related specifically to their individual music libraries.

In some embodiments items are identified as similar based on an analysis of the program participants' libraries. For every media item represented in at least two program participants' media libraries a vector is plotted representing the presence of that media item in the respective program participants' libraries. Each vector, represents a media item and can be compared to every other vector. For any two items, the closer the relationship between any two vectors, the more similar those two items are said to be with respect to each other.

Using the similarity data identified above, a clustering analysis can map the individual media items collected from the program participants' libraries into server clusters or groupings of media items in the server database that are all relatively similar to each other. In some embodiments, the clustering analysis can be applied recursively on each server cluster to result in smaller server clusters comprising media items having a stronger similarity relationship to each other than the media items comprising the "parent" cluster. By recursively applying the cluster analysis a tree-like relationship of server clusters can be generated with each "parent" server cluster having two or more "child" server clusters dividing the contents of the "parent" server cluster among the "child" server clusters. This recursive analysis can be applied as often as desired, but in some embodiments the analysis is reapplied until "child" server clusters have 1000 media items or less, or 100 media items or less, or 50 media items or less. Server clusters meeting this criterion will be the lowest-level server clusters in the tree.

In some embodiments the clustering analysis is combined with editorial partitions. While it is simplest to perform the editorial partitions before the clustering analysis, the editorial partitions can be performed at any time. In some embodiments canopies of non-overlapping groups of potentially similar media items are created based on genre information before the clustering analysis is performed. For example, in the case of music, music media items that belong to the "rap" genre will never be considered similar to music media items that belong to the "opera" genre. Accordingly, the entire collection of media items can be separated into large canopies of non-overlapping groups such as "rock", "rap", "classical", "opera", etc. However, just because media items are grouped together into the same canopy, it does not mean that each of those items is similar to each other, but they can be.

The server can generate participant clusters that contain only media items present in a program participant's media library by projecting the similarity relationships represented by the server clusters into a program participant's media library. Since the server already knows of the contents of a program participant's media library, the server can determine which lowest-level server clusters contain each item in the program participant's media library and form participant clusters therefrom.

If any one of the participant clusters contains too few media items, for example less than 20 or less than 50 media items, the server can recursively agglomerate clusters sharing a common parent server cluster. By repeating the agglomeration action, a program participant's media items that descend from a common parent are accumulated into a larger participant cluster until the participant cluster has reached an acceptable size. In some embodiments the agglomeration action continues until only a determined number of clusters remain.

The server can send, and a client device can receive, information about participant clusters created from the media items of a program participant's media library. The client device can receive a listing of all media items contained in any given cluster from the server. As described above, the clusters have been compiled based on an agglomeration of the program participant's tracks found in hierarchically related participant clusters of media items on the server. The clusters of media items have been determined based on a cluster analysis of the media items in the server's inventory based on the relative similarity of each song in the inventory to each other, the relative similarity among songs have been determined by an analysis of the incidences of co-occurrence of media items within different program participants' media libraries.

The resulting participant clusters can be used to generate and play a mix of media items. The mix comprises media items represented in one of the clusters of media items contained within the program participant's collection of media items received from the server. In some embodiments, the mix contains a selection of some of the items represented in a cluster and other songs deemed similar to those media items. In other words, the media items of the cluster can act as seed items for the rest of the mix. It will be appreciated that there are numerous ways to select which media items from within the cluster will be used as seed items to create the mix. For example in some embodiments, the media items can be selected based on their relative similarity to the cluster as a whole. In some embodiments, all the items of the cluster can be used in creating the mix.

It should be appreciated that unique aspects of this overall program or system take place on servers of the media supplier (online music store), the media playing devices of the participants, and often intermediate facilities, such as the users' personal computer that accommodates communication between the playing device and online store's computer systems.

BRIEF DESCRIPTION OF THE DRAWINGS

In order to best describe the manner in which the above described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 2 illustrates an example method embodiment for receiving and identifying items in a program participants library and generating similarity data;

FIG. 4 illustrates a sample purchase matrix;

FIG. 5 illustrates a column in a master similarity table;

FIG. 6 illustrates an individual similarity table;

FIG. 12 illustrates an exemplary method of computing a cluster vector;

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
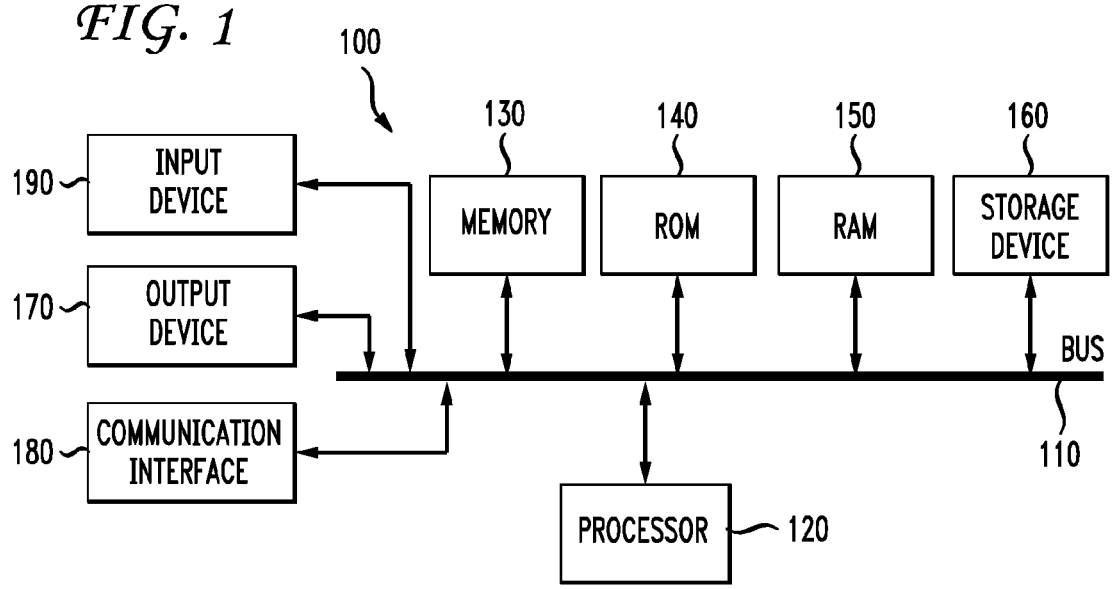
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), or read only memory (ROM), may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The computing device described above is particularly useful for generating and using mixes of media items based on a clustering analysis of similarity data derived from a large sample of users. Based on mathematical analysis to determine the incidence of correlation of two or more songs across multiple users' libraries, a statistical similarity can be determined. From the statistical similarity data, a clustering analysis can divide a large data set into smaller sets of related media items. By projecting the results of the analysis of the large data set into smaller data sets (media libraries of individual program participant's) high quality mixes of media items can be created.

This similarity data can be used for a variety of helpful functions including generating high quality playlists, determining suggested products for recommendation to a user for purchase, keeping a user's media device up-to-date with a fresh selection of songs, generating mixes from a user's media library among others. In one example, users may upload information relating to the contents of their entire media database to a server accessible to a wide audience of users. Based on how often two or more media items co-occur in the libraries of the entire audience of users, media items become correlated to each other and are noted as similar. Based on this similarity, the server can create a playlist to include one or more similar songs based on the selection of a seed track, or the server could recommend purchase of similar songs not in the user's library. These and other features of the system will be described in more detail below.

The clusters can be used in any way in which a collection of similar items can be used. In one example, clusters are useful in generating playlists based on the contents of a cluster. In another example, clusters are useful in generating mixes of media items. Mixes in this context are analogous to the concept of music mixes wherein a listener would create a CD or tape of a selection of music items that went well together. In this case, clusters provide the device with a method of automatically generating mixes of media items.

While many of the features of the described techniques and products will be described with reference to an online music store such as Apple Inc.'s ITUNES Store, it should be appreciated that the system does not require any media sales whatsoever to carry out the preferred embodiments of the system. Further, while some of the descriptions may refer only to one particular form of media, the principles described herein can be applied to any media, such as audio, video, still pictures, documents and other types of data files.

Server

Uploading

FIG. 2 illustrates an example method embodiment for generating similarity data. The method includes receiving by a server, user data related to program participants' personal media inventory (202). The user data comprises identifying information regarding individual media items in a user's library usually in the form of metadata. The origin of the media items within a user's library is not relevant to the system. Even if the method described is employed by a music content store, the present embodiment does not require that a user's files originate from the music store since the server does not differentiate between file information based on source—all media items are treated the same. The method applies equally to physical media, such as CDs, DVDs, or HD-DVDs, as well as instances where the physical media is transcoded to digital format and entered into the user's media library. In a preferred embodiment, the server does not require that a user upload information regarding all media items in their library; information regarding only a limited number of media items or only partial information about the media items is also accepted by the server.

Identifying User Data

The method also includes identifying the user data as specific media items (203). This step may be accomplished in any one of a number of ways including examining the file name, metadata or through a detailed analysis of a portion of the file. In the example of a music track, the server can identify the music track through a variety of mechanisms. For example, a given track such as Led Zepplin's Stairway to Heaven having a length of approximately eight minutes can have a variety of data associated with the file including the file name or metadata identifying the artist, song name, genre, length of track, album name, track number, etc. A portion of this data can be sufficient for the server to identify the file as Led Zepplin's Stairway to Heaven from the album Led Zepplin IV. Alternatively, commercial song identification services can be used to identify the file. It is also possible to identify the track by sampling a portion of the music track or by recognizing a unique identifier from a purchasing store or by recognizing the songs digital fingerprint. For example, the server or service can recognize that a song was bought from the ITUNES Store and the file's metadata contains a unique identifier specific to the ITUNES Store. The server can identify the media item by that identifier. It should be appreciated that many other possible methods of recognizing media items are well known and all of which are encompassed by the disclosed method and arrangement.

Correlation

Each media item is associated with a unique identifier (204) and stored in a table (205). If the server has never encountered the song before, the server assigns a new identifier to that track. However, for most media items, an identifier will already be assigned and media need only be correlated with that identifier. Continuing with the example of Stairway to Heaven, once the media item has been identified as that track, the server can look up the unique identification data for that track. This process is repeated for each media item received by the server.

Although the server will already have an identifier to associate with most songs, in some cases, the media item will be completely new to the server, or at least recognized as such. In these cases, the server will issue a new identifier and assign it to that media item. For example, a new artist or garage band might not be recognized by the server. However, the server will issue a new identifier for that artist's track and when the server encounters the same track in a different user's library, it will assign the same identifier to that track as was previously issued.

In some cases, the server might not supply a new identifier to a media item that is new to the server. For example, a media item might be unique to a user's library and therefore providing an identifier would not be of any value since there would be no incidences of co-occurrence for that item. Accordingly, the system need not supply a unique identifier to all new items. Later, the system can supply a unique identifier for that track and supply similarity data for that item if and when other users also have that media item in their libraries.

Master Purchase Matrix

Each media item is stored in a master purchase matrix in step 205. An illustration of the master purchase matrix is shown in FIG. 4. The purchase matrix 402 is a table that contains columns 404 corresponding to each unique media item in the table. In the embodiment wherein the table is hosted by a music content seller, such as the ITUNES Store, the purchase matrix will also include all media items available for purchase from the ITUNES Store. The rows of the master purchase matrix 404 are associated with user unique user identification numbers 406. This identification code represents users by an anonymous identification code possibly known to the user, but not the system. Thus the master purchase matrix contains a record of every file received by the program server from every user that participates.

As the purchase matrix accommodates all program participants and all media in each program participant's library, the purchase matrix 402 is likely to be staggeringly large. For example, if a music store has approximately 2.25 million users and more than 5 million songs, a purchase matrix for such an online store would be a table of approximately 2.25 million rows and 5 million columns, or 1,125 billion individual cells. ITUNES Store has over 50 million registered users and contains over 10 million songs. A purchase matrix for such an online store could be a table of approximately 50 million rows and 10 million columns, or 500,000 billion individual cells.

For songs in a user's library, the cell in the matrix corresponding to that user and that song is marked. The marking may be done with a data type as simple as a Boolean, 1 for purchased 408 and 0 for not purchased 410. Other data types may be used when more data must be stored than a Boolean data type will allow. While the matrix can be very large, it is very sparsely populated because most users have relatively few songs (compared to 5 million) in their library. Each user row may only contain a handful of entries while each song column may contain tens, hundreds, thousands, or even millions of entries for more popular songs, but the vast majority of the purchase matrix is empty.

It should also be appreciated that the master purchase matrix or table will require updating as user libraries change, from adding new songs to their library, changing file metadata, or deleting files. The purchase matrix may be updated in real time or transactions may be queued up for insertion at a later date. One arrangement for queuing inserts transactions into the purchase matrix on a regular basis, such as every day at 11:30 p.m. Another queuing arrangement inserts transactions into the purchase matrix when some minimum number of transactions is ready for insertion.

Updates to the purchase table do not require repeating steps 203 and 204 for all media items. Media items that have already been identified and correlated to a program-based identification number do not require the identification and correlation step because it has already been performed when the user's data initially populated the table. In one embodiment, once the server has correlated the media item to its identification data, the server can send the identification data back to the user for storage in metadata. In future communications with the server, the server can receive updates to a media item with the associated identification data thus avoiding the need to redo step 204.

In some embodiments the purchase matrix may be part of a larger table or matrix including additional information regarding each transaction such as time and date of sale, what format the media is in, whether the media is high definition or standard definition, whether the transaction is a gift or whether it was paid for, which devices are authorized for playback, etc. The purchase matrix may be discrete, separate tables or may be wholly integrated into a larger table or matrix.

In still yet another embodiment, the master purchase matrix need not contain uploaded information about a user's media inventory. The master purchase matrix can be essentially comprised of purchase information. Purchase information can be only items purchased from the online store by users or can include additional information. In this embodiment the table can contain a list of all items purchased by each user. Still, the master purchase matrix would likely contain at least a limited set of data regarding the content of a user's media inventory.

Collaborative Filter Engine

The method illustrated in FIG. 2 next comprises running a calibration filter engine (shown as 308 in FIG. 14) on the master purchase matrix to generate similarity data (206) and store the similarity data in a master similarity table (207). Similarity data can be derived from a media item's incidence of co-occurrence with some other media item in the master table. When users have the same two media items, they are said to co-occur. Such co-occurrence in multiple users' libraries is an indication that the two media items are "similar." The more often two media items co-occur in program participants' libraries, the more similar the media items are said to be.

The collaborative filter engine 308 calculates the similarity between individual media items in the master purchase table. In one embodiment the collaborative filter engine can be as simple as a program that tallies the number of times pairs of songs in the database co-occur in the program participants' libraries.

In some embodiments, the collaborative filter engine can calculate the similarity between two different media items by representing each item as a vector in a multidimensional vector space. The number of dimensions is equal to the number of users in the purchase matrix 306 (in FIG. 14). A correlation between items is developed by computing the distance between the vectors. A pure or modified trigonometric function (e.g. cosine or sine function) can be used to calculate the distance between vectors. If the two vectors have a small angle, they are considered to be similar and if the two vectors have a large angle, they are considered to be less similar. This process is carried out by comparing each song in the master purchase matrix to every other song in the master purchase matrix.

In some embodiments the collaborative filter engine can take into account more than the incidence of co-occurrence data. For instance, the incidence of overall occurrence can be factored into the similarity rating. For example, songs A and B may co-occur equally as often as songs A and C, but songs A and B can have a higher similarity score (that is, deemed more similar) than songs A and C if song B is more popular overall. One way of determining the popularity of the different songs is by measuring how often each song occurs in the overall data set.

Likewise there can be other inputs into the collaborative filter engine which affect similarity scores, such as usage inputs. For example, ratings given to the media items, play counts, and skip counts can all be inputs into the collaborative filter engine for determining similarity between media items.

Figure 3A:
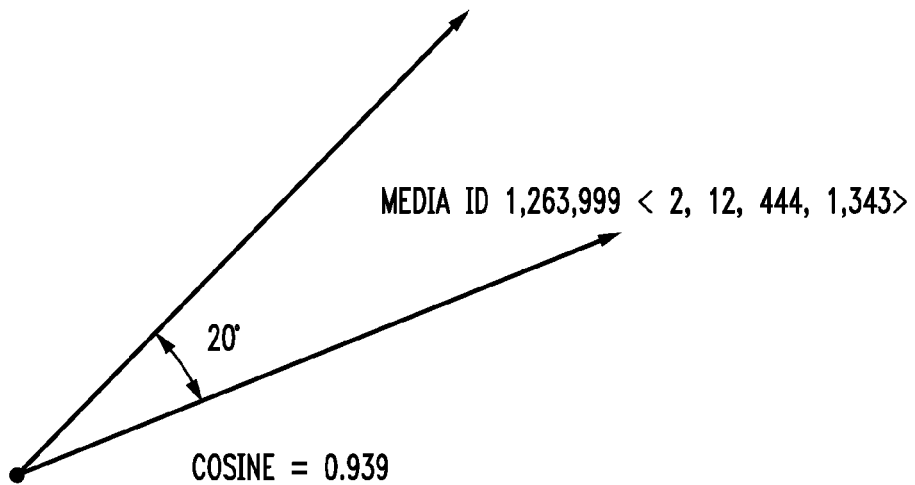
FIGS. 3A and 3B illustrate a method of determining correlation data.
Figure 3B:
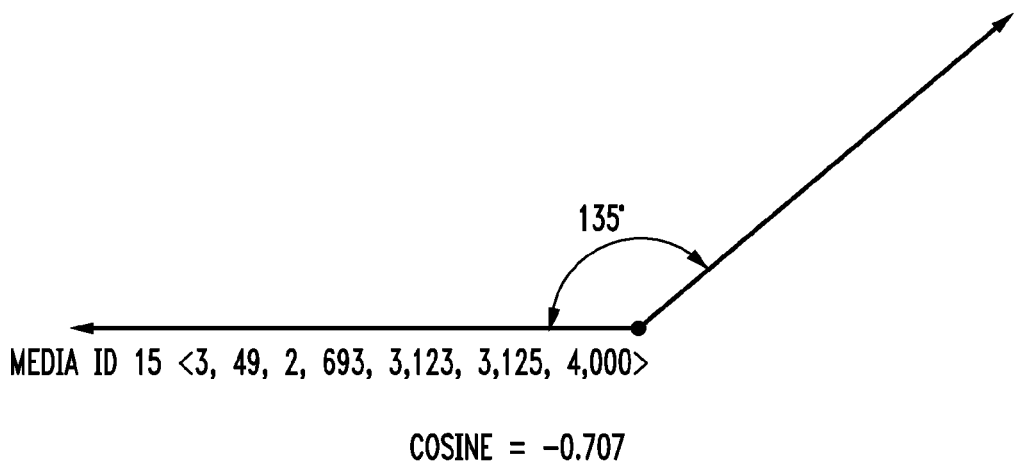

FIGS. 3A and 3B illustrate the concept of representing each song as a vector. In FIG. 3A, a vector for Media ID 629 in the master table has been mapped out based on the songs existence in the libraries of users 2, 899, 1,343 and 2,000. Likewise, a vector has been mapped for Media ID 1,263,999 in the master table based on the song's existence in the libraries of users 2, 12, 444, 1,343. The angle between these two vectors is measured to be twenty degrees and calculates to a cosine value of approximately 0.939. The cosine value represents the correlation value between Media ID 629 and Media ID 1,263,999. FIG. 3B represents another correlation calculation to determine the correlation between Media ID 629 and Media ID 15. In this example only one user has both Media ID 629 and Media ID 15 in their libraries and therefore the cosine value between these two vectors is approximately 0.707. The lower score indicates that Media IDs 629 and 15 are not closely correlated to each other.

In another embodiment, other functions can be used to calculate the similarity scores between items. By way of example the similarity score can be calculated in a method that takes into account the percentage of an item's total co-occurrences that is made up by a particular item. For example item A co-occurs with items 1-5 and the item A's total co-occurrences is the sum of all the co-occurrences with items 1-5. For instance, if item A co-occurs with item 1 two times, item 2 two times, item 3 two times, item 4 ten times, and item 5 two times, then item A has 18 total co-occurrences. It can be valuable to learn what percentage of the total number of co-occurrences is due to a particular pair. For example, item 4 represents approximately 55% of all of item A's co-occurrences and therefore is more strongly correlated with item A than any of the other items which represent only about 11% each of the total of A's co-occurrences. This data can also be used to determine similarity data. Although two specific methods of calculating similarity data are illustrated above, it will be appreciated that any number of other methods of calculating the similarity between two items can be used.

The process above is computed between every item and every other item at some regular interval. As this process could take inordinate amounts of time, it is typically performed offline. It could be performed once a month, once a week, once a day, or as frequently as computing capability allows.

Similarity Table

The correlation data compiled by the collaborative filter engine is used to generate a master similarity table (207 of FIG. 2). FIG. 5 illustrates data stored in a master similarity table 502. For a given media item, there is an entry in the master similarity table identifying the media item by its program-based identification data 504. Each other media item considered to be similar or correlated to that media item is also listed in the table 508. In this way the table 502 maintains a list of all media that is similar to each media item in the master purchase matrix 402.

Items are included in the master similarity table if they have a sufficient score to be considered similar or correlated to the media item. For any given item, most of the other items are not similar at all. When the similarity score is sufficiently low, it is not included in the similarity table. The threshold for determining if a similarity score is sufficiently low or high may be dynamic or static. For example, if a similarity score ranges from −1 to 1, −1 being completely dissimilar and 1 being extremely similar, the threshold may be statically set to 0.5. The threshold may be dynamically set based on the number of occurrences of the song in the master purchase table, such as a threshold of 0.9 for songs occurring under 100 times, 0.7 for songs occurring under 5,000 times, 0.6 for songs occurring under 25,000 times, and 0.5 for songs occurring 25,000 times or more. The threshold may also be based on available storage or any other parameter.

In other words, the master similarity table 502 may incorporate all or some of the similarity scores. If the master similarity table must be constrained to fit a certain storage size, then only the best or strongest similarities are included and the rest are culled out. Similarly, if not enough program participants have an item in their media inventory, it could be excluded. One variation on this is to require a minimum number of occurrences in users' libraries before an item is eligible for inclusion into the master similarity table. For example, if two items have a co-occurrence of five or less, i.e. if five or less people have both of these items, the system does not compute the rest of the score.

In some embodiments the master similarity table can also store equivalency relationships. For example, media ID 17 in table 502 may correspond to "O Sole Mio" by Luciano Pavarotti, as performed in 1990. Multiple renditions of "O Sole Mio" by artists such as Enrico Caruso and Mario Lanza are available in the online store and are considered equivalent media 506. Other notable types of equivalent media include official album tracks, unplugged acoustic tracks, live concert tracks, cover tracks by other bands, and even foreign language tracks of the same song. A single song may exist in all the listed forms, and more. The determination of equivalency can be performed by hand or can be automatically performed based on the actual media content, metadata, and/or other available data. Equivalent media IDs for each are presented alongside the media ID 504 to identify that each of them is considered the same and that they are counted together.

The IDs in the master similarity table may be the same as those used in the purchase matrix 306 to index media or they may be based on an entirely different scheme. If the two do not align, a translator function or reference translation table can be provided to convert one ID to the other and vice versa. A common ID space shared between the two is likely to be the easiest and simplest to maintain without a performance penalty.

User Similarity Tables

Although the master similarity table contains the universe of similar media, a personal media library is almost certain to include a lesser subset of that universe of similar media. Thus, a constrained set, or an individual similarity table, is generated. The constraint is tailored to media availability in a given library. The constrained set may also include references to similar media not found in the media library. This can be done in order to target suggested media purchases to a user. Such targeted suggested purchases are likely to be more appealing to the user because other people with some common media tastes already have the suggested purchase in their library.

Once the master similarity table 502 is calculated and populated, individual similarity tables 602 are generated. FIG. 6 illustrates an individual similarity table. An individual similarity table 602 contains a media ID 604 for each song contained in the individual's media library and media correlated to that media ID. Correlated media 606 are shown in braces. Correlated media in an individual similarity table are a subset of the entire list of sorted similar items 508 located in the master similarity table of items. The subset is selected based on which media are present in the individual's media library. In other words, for each song in the individual's library, a list of similar media also contained in the individual's library is generated. Items 608 represent an alternate embodiment wherein the values are media IDs of songs that are not in the program participant's library, but are recommended for purchase.

Individual similarity tables can be generated by the server at the server and downloaded by client devices or individual similarity tables can be created by the client by downloading only similarity data for items in the user's media inventory. Regardless of where the similarity tables are created, the process is the same. Media items are looked up in the master similarity table by that item's program-based similarity identification data. Next the system can lookup the location of the similarity data for that media item in an index. Based on the results of the lookup operations, the system can retrieve the similar items. These items are further compared with those media items in a user's media library and only those items that are present in the user's media library are stored in the individual similarity table. In an additional embodiment, some highly similar tracks could also be recorded in the individual similarity table to be used for suggesting purchases to the user.

In some embodiments, at least one individual similarity table per library can be generated by the server. The client can send the library data to the server, which can identify the items in the library and generate the individual similarity table for that library by extracting the similarity data from the master similarity table pertaining to the items in that library. The resulting individual similarity table can then be downloaded to the client for use in generating playlists. The same individual similarity table can also be used by the client to create individual similarity tables for peripheral devices.

Using these individual similarity tables, users can benefit from data derived from the entire population of users. Users can use the similarity data to create playlists, receive suggestions for new media purchases, and a variety of other possibilities.

User Data Influencing Collaborative Filtering

In the embodiments wherein a playlist is generated based on similarity data, users can provide, or the system can require, feedback by skipping songs that they do not want to hear in that playlist or they can give positive ratings to media items that they enjoy hearing in the playlist. Such data can be uploaded from the client devices and received by the server. Feedback data can be stored in any number of different modes such as in the master purchasing index or in separate tables. Feedback can also be derived from online music stores such as the ITUNES Store. In this embodiment, user activity on the online store 304 (in FIG. 14) generates feedback data. User activity on the online store can include: purchasing media items, previewing media items, searching for a particular media item title, searching for a particular media item artist or searching for a particular media item genre. Feedback data can be used by the collaborative filter engine to modify correlation scores between items.

Feedback data from the population could potentially eliminate a correlation that otherwise exists. For example, the song Mrs. Robinson by Simon and Garfunkel may receive a strong correlation to the same song by the Lemonheads or Frank Sinatra, but users intending to generate a playlist based on the Simon and Garfunkel version might not like the different versions—perhaps due to the different genres of the cover songs. Over time, feedback data such as skipping the song or removing the item from the playlist could be used to eliminate one or both cover versions from the list of correlated items.

In some embodiments, user feedback can also be used to modify similarity data directly on the client device without sending the feedback to the server first for use by the collaborative filter engine. In these embodiments, user feedback data can directly effect the relationships stored in the individual similarity table on the client device without first synching with the server. Alternatively, the similarity table can remain the same, but constraints can be generated based on user feedback data. For example, if a user skips a similar item often, the client itself can either no longer consider that item as similar by removing the item from the individual similarity table or can prevent the addition of the frequently skipped item from inclusion in the playlist by other means, such as a constraint in the playlist algorithm.

Updating Similarity Table

Over time, new media items can be added to the online store, and by extension, the master purchase table, as artists create new music and new artists emerge. Accordingly, a correlation between existing items in the online store 304 and newly added items in the online store may form. For example, if a user has Song A in his/her media library and subsequently purchases a newly added Song B that was recently introduced on the online store 304, then a new correlation between Song A and newly added Song B may form. When a user purchases newly added Song B, the transaction is recorded in the purchase matrix 306 and an updated purchase matrix 306 is generated. Alternatively, Song B may have been added to a user's library by copying the track from a CD. In such a circumstance, the result would be the same. As long as both Song A and Song B are in the user's media library, this co-occurrence is recorded in the updated master purchase matrix.

The collaborative filter engine 308 uses information from the updated purchase matrix 306 to generate an updated master similarity table of items 316 as described above. Thereafter an updated individual similarity table 322 can be generated for each user by extracting only those items in the updated master similarity table 316 which have been changed. Alternatively, an entirely new individual similarity table can be created based on the new data.

Clusters

Figure 7:
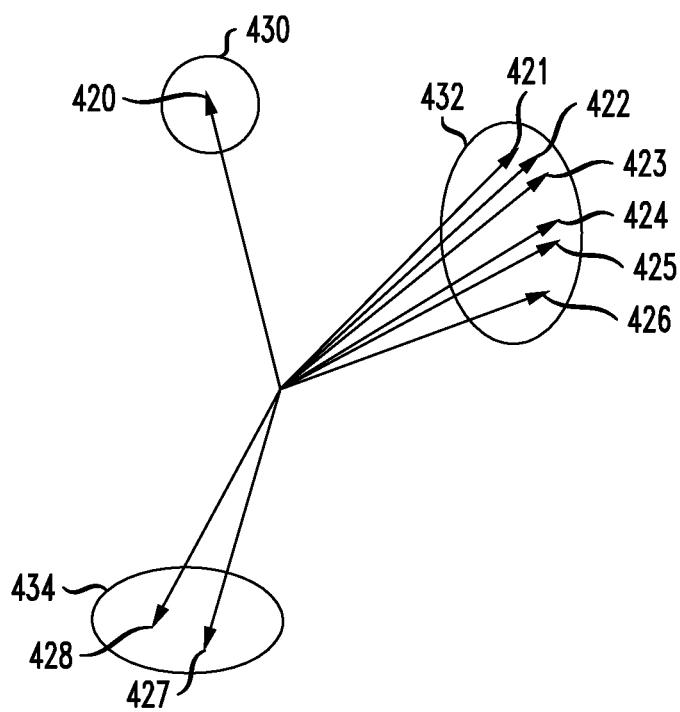
FIG. 7 illustrates an exemplary method of identifying clusters in a vector space.

The similarity data discussed above can also be utilized in a clustering analysis to identify groups of media items. At a conceptual level, the clustering analysis graphs items based on the similarity vectors and selects items that are plotted relatively closely together in the graph. For example, FIG. 7 illustrates a graph of several media items 420-428 as similarity vectors representing media items and every media item similar to that item, wherein the vectors are grouped together to form three clusters of similarity vectors. A cluster analysis groups media item 420 in its own cluster 430, media items 421-426 in cluster 432 and media items 427-428 in cluster 434.

In a music context, the clusters 430, 432, and 434 could represent media items belonging to separate genres, sub-genres, or just groups of media items that are more related to each other than other media items.

Figure 8:
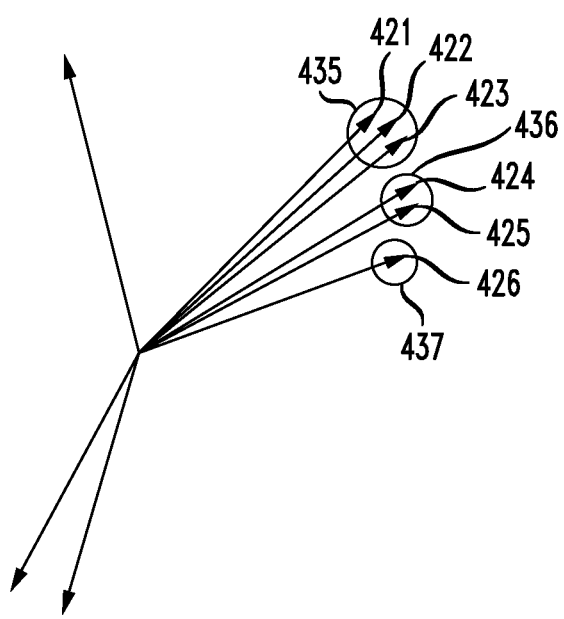
FIG. 8 illustrates an exemplary method of identifying sub-clusters in a vector space.

FIG. 8 illustrates child clusters of cluster 432. FIG. 8 shows the same similarity vector space as illustrated in FIG. 7, however, media items 421-426, which were grouped into cluster 432 in FIG. 7, are subdivided into child clusters 435, 436, and 437. Child clusters 435-437 can be generated by reapplying the cluster analysis on the smaller group of items contained in cluster 432.

Figure 9:
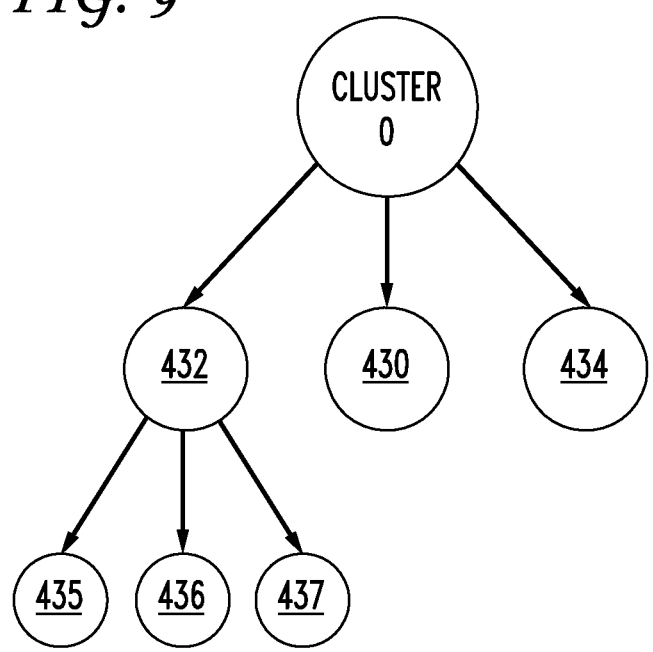
FIG. 9 illustrates an example server cluster embodiment.

FIG. 9 illustrates the clusters computed in FIGS. 7-8 in a tree diagram. At the top level, CLUSTER 0, contains all of the media items represented in FIGS. 7-8. The second level having clusters 432, 430, 434 correspond to the same clusters in FIG. 7. The child clusters at the bottom of the diagram 435, 436, 437 correspond to the same clusters in FIG. 8. More specifically, performing a clustering analysis on CLUSTER 0 arrives at the clusters shown in FIG. 7 and illustrated by the middle nodes in FIG. 9. Likewise, performing a cluster analysis on parent cluster 432 results in child clusters 435, 436, 437 shown in FIGS. 8 and 9.

There are many known mathematical forms of clustering analysis. In the present technology mechanisms of hierarchical clustering are employed. Hierarchical clustering creates a hierarchy of clusters that may be represented in a tree structure, as discussed above. These algorithms can be either agglomerative ("bottom-up") or divisive ("top-down"). Agglomerative algorithms begin with each element as a separate cluster and merge them into successively larger clusters. Divisive algorithms begin with the whole set and proceed to divide it into successively smaller clusters. A divisive clustering analysis was illustrated in FIGS. 7-9. It will be appreciated that many techniques for clustering analysis exist and can be applied in the present technology.

In some embodiments the type of clustering analysis applied is art as a k-means analysis. The k-means algorithm assigns each point to the cluster whose center is nearest. The center is the average of all the points in the cluster—that is, its coordinates are the arithmetic mean for each dimension separately over all the points in the cluster. For example: if the data set has three dimensions and the cluster has two points: $X=(x1, x2, x3)$ and $Y=(y1, y2, y3)$. Then the center Z becomes $Z=(z1, z2, z3)$, where $z1=(x1+y1)/2$ and $z2=(x2+y2)/2$ and $z3=(x3+y3)/2$.

Figure 10:
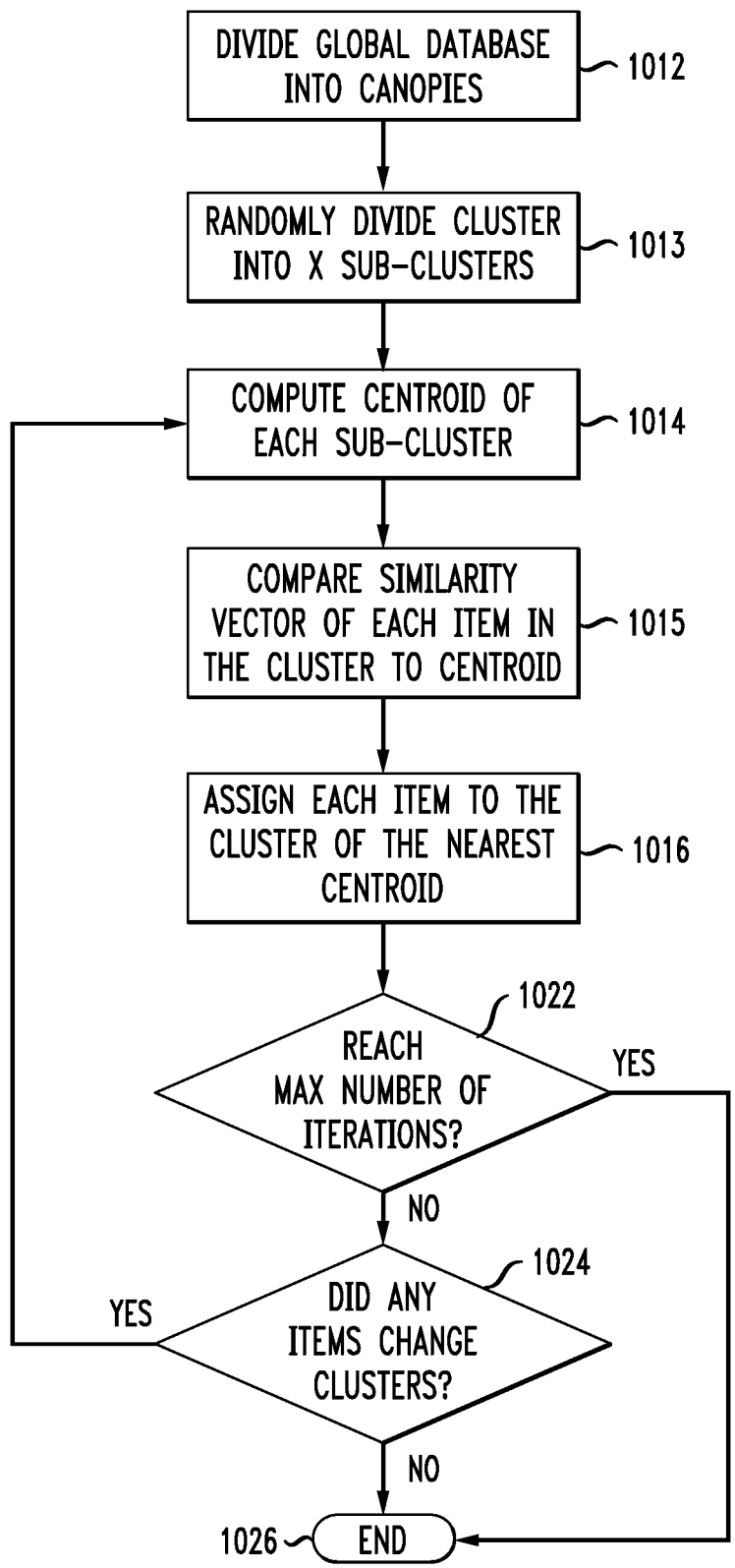
FIG. 10 illustrates an exemplary method of generating server clusters.
Figure 11:
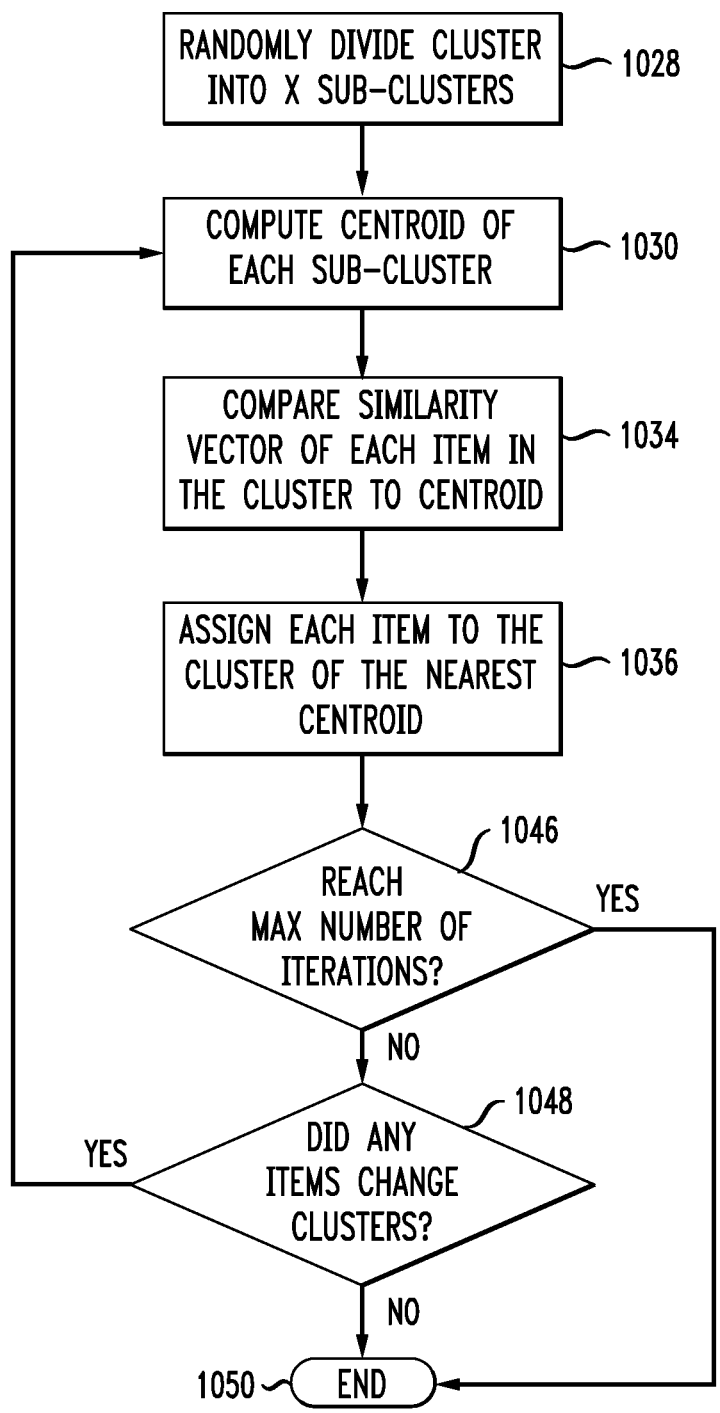
FIG. 11 illustrates an exemplary method of generating server clusters; s

A k-means analysis performs the following steps: (1) Choose the number of clusters, k; (2) Randomly generate k clusters and determine the cluster centers, or directly generate k random points as cluster centers; (3) Assign each point to the nearest cluster center; (4) Re-compute the new cluster centers; (5) Repeat the two previous steps until the lowest level clusters have less than a determined number of media items within each lowest-level cluster. An example implementation of a K-means analysis is illustrated in FIGS. 10-12.

In some embodiments, the database of media items is divided into canopies (102) based on any reasonable criteria. While not necessary to achieve clusters of highly similar media items, this step can be useful in a variety of ways. First, in the case of large datasets, a simple division of the database can reduce the computation resources required to compute clusters for the top level of the database. Instead of performing a statistical clustering analysis on the entire database of millions or billions of media items, the statistical clustering analysis can be performed on smaller subsets of the whole.

Figure 13:
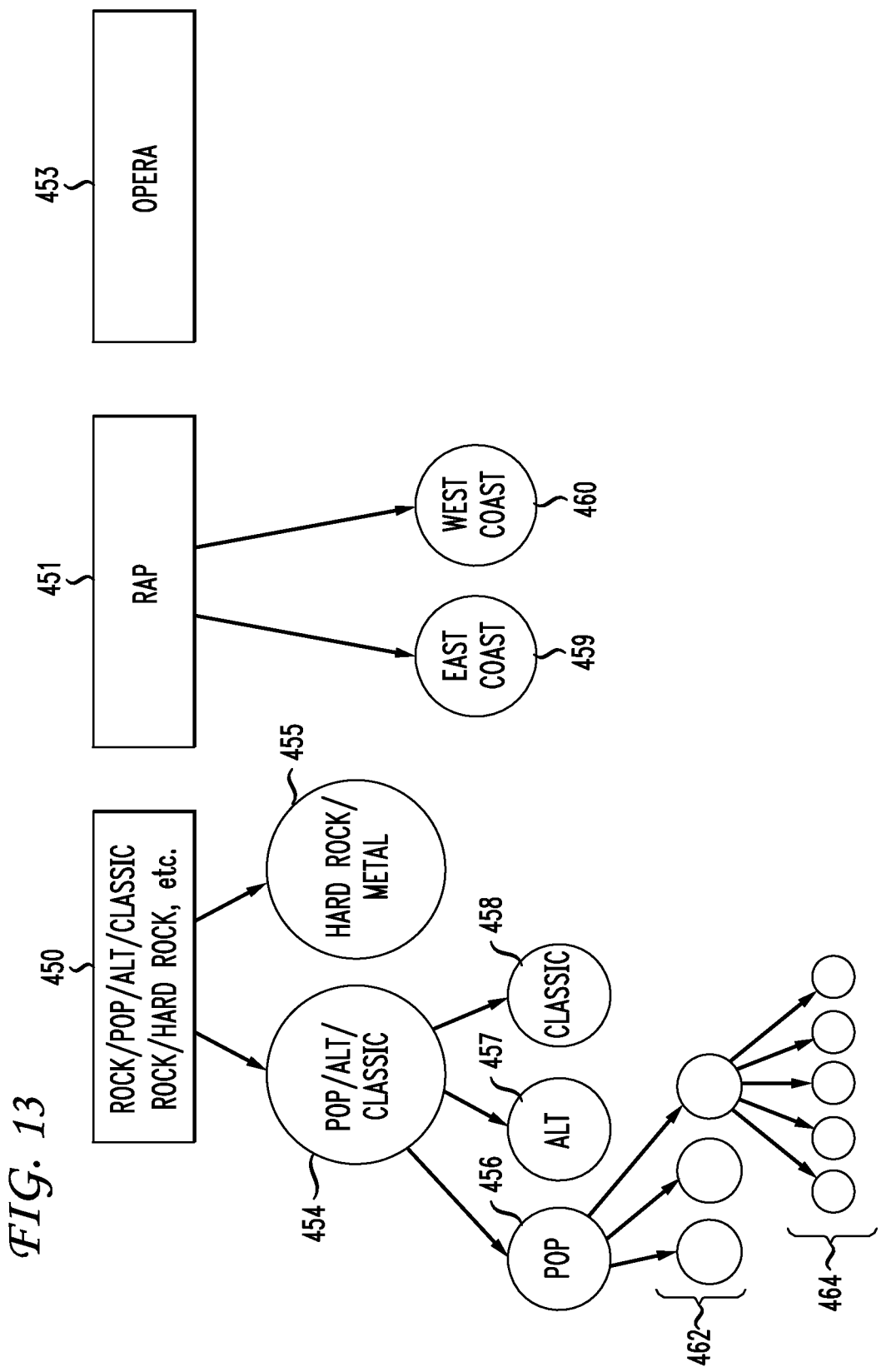
FIG. 13 illustrates an example server clusters and canopies embodiment.

Additionally, dividing the database into canopies can also enhance the quality of the resulting clusters. For example, the canopies can be generated based on editorial divisions. In FIG. 13, canopies 450, 451, and 453 are examples of divisions of an entire database of music items into non-overlapping groupings of non-similar genres of music media items. In such instances, the editorial decision that varieties of rock 450, rap 451 and opera 453 music media items are never similar to each other has been made and the database of media items has initially been split into these canopies.

In some embodiments the canopies can be divided into sub-canopies based on editorial decisions. However, in preferred embodiments, the canopies should only be divided so that the canopies or sub-canopies separate items that should never be grouped together because items in two different canopies cannot later be grouped in the same cluster.

Next, the chosen clustering algorithm can be performed on each canopy/sub-canopy to further subdivide the database into clusters. As illustrated in FIG. 13, the rock canopy 450 has been divided into two sub-groupings of similar media items, pop/alt/classic rock 454, and hard/metal rock 455. Likewise the rap canopy 451 has been further divided into east coast rap 459 and west coast rap 460 clusters. It should be noted that while FIG. 13 illustrates the clusters being subdivided by genre and sub-genre, this is for purposes of illustration only. The statistical clustering algorithm will subdivide clusters according to the statistical analysis of similarity data, which is based on occurrences of media items in the libraries of program participants, and will likely produce clusters having media items in a variety of compatible genres.

The clustering analysis can be performed as follows: The items in a given canopy or sub-canopy are randomly divided in to X (X being an arbitrary number greater than 1) number of clusters (1013). For each cluster a centroid is calculated.

FIG. 12 illustrates one method of calculating a centroid. 1050 is a collection of similarity vectors for the media items in a given cluster. The similarity vector lists media items that are the most similar to the media item in order of descending similarity. For example 1050 illustrates a vector for items 1, 2 and 25 which are grouped in a cluster. Item 1 has media item 1 as most similar to it and item 25 as second most similar and so on. Each item in the cluster is then given a value based on how similar the item is to the other items in the cluster. This is accomplished by assigning weighted values (weighting more similar items greater than less similar items) to each item and adding up the values. For example, 1052 illustrates a table having each item found in the similarity vectors of the media items presented in the cluster and their associated weighted values. Notice that not every media item in the table is actually in the cluster.

Item 1 was most similar to Item 1 and thus is given a value of 100 and item 25 was second most similar and is given a value of 99. The scores for each item are totaled to result in each item's score. For this cluster Item 1 receives a score of 199. Item 25 is highly ranked in each list and accordingly receives a higher score of 298. The scoring is calculated for each item. The final scores can be sorted and used to create a similarity vector for the entire cluster 1054. This process is repeated for each of the X number of clusters to result in X centroids.

Many different scoring mechanisms are conceivable and are considered within the present technology. The illustrative method described above is just one method of calculating a centroid for the given cluster. In the present example the centroid is effectively an average of all the media item's similarity vectors of those media items within the cluster.

Once the centroids have been calculated, the randomly created clusters can be discarded. Their purpose was only to establish centroids. Next, the similarity vector for each media item within the canopy is compared to each centroid (also a vector) (1015) and each media item is assigned to the cluster containing the nearest centroid (1016) to create X clusters.

The process is run iteratively to generate the highest quality cluster by computing the centroid for the existing cluster (1014), and then comparing each items similarity vector to each new centroid (1015) and clustering items to the nearest centroid (1016). The process ends (1026) once either the maximum number of iterations has been completed (1022) or media items no longer migrate from one cluster to another (1024). In this way, the iterative process slowly refines the cluster analysis by refining the centroid and migrating songs into the appropriate cluster.

The entire process can be re-run on any given cluster. For example, the process can be re-run on any of the X clusters created above to create sub-clusters as illustrated in FIG. 11. Anyone of the X clusters can be randomly divided into X sub-clusters (1028) (again, X can be any arbitrary number greater than 1). The centroid for each sub-cluster is calculated (1030), each media item's similarity vector is compared to the vector for each centroid (1034) and grouped into clusters (1036). A new centroid is calculated (1030), and each media item is compared to that centroid (1034) and grouped into clusters (1036). The process repeats until the max number of iterations has been completed (1046) or no media items change clusters (1048) and the process ends (1050).

The process can continue to repeat until the population of media items has been reduced to a desired number of clusters or clusters of a desired size.

In an alternate variation on the clustering method described above, instead of clustering the media items individually, the items can be clustered by artist. Just as described above, the media items will be divided based on editorial decisions which eliminates the possibility of non-similar songs by the same artist from being group together.

For each artist represented in a canopy, a vector can be created in the same way the centroids are created and illustrated in FIG. 12. Each song by an artist in a canopy is grouped together and an artist vector is generated. The vector contains each song from the artist that is the canopy. Having computed vectors for each artist, the clustering algorithm can use the artist vectors in place of media items and organize the artists into clusters. The iterative clustering process is complete once the process has repeated a selected number of times or only a chosen number of artists remain in each cluster, for example 3 artists. Having completed the clustering process, the artist vectors can be returned into media items by identifying each song in the artists' vector.

The process described above can be used to generate clusters of every media item in a database on a server. Once the entire database has been divided into a complete tree of server clusters, the tree of server clusters can be used to generate participant clusters. Participant clusters are specific to an individual user's library and contain only media items contained in the participant's media library.

Figure 14:
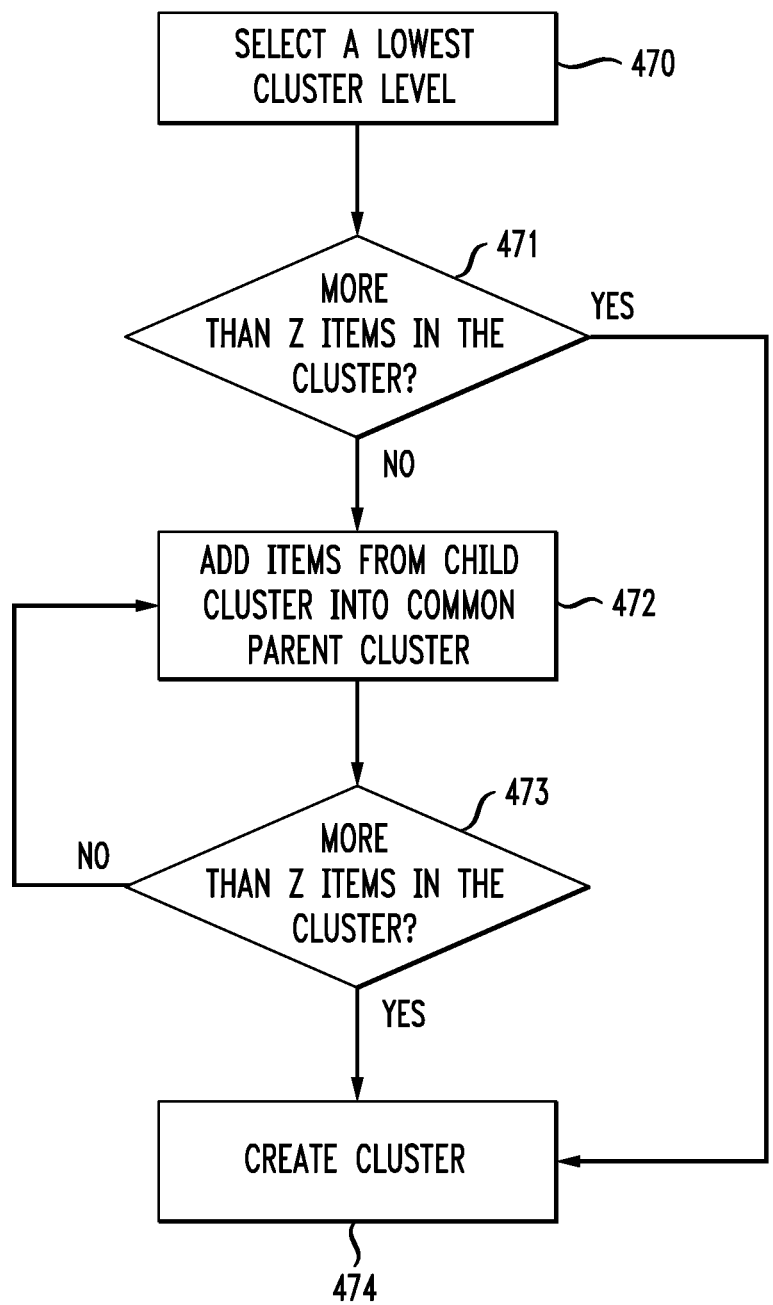
FIG. 14 illustrates an exemplary method of generating participant clusters.
Figure 15:
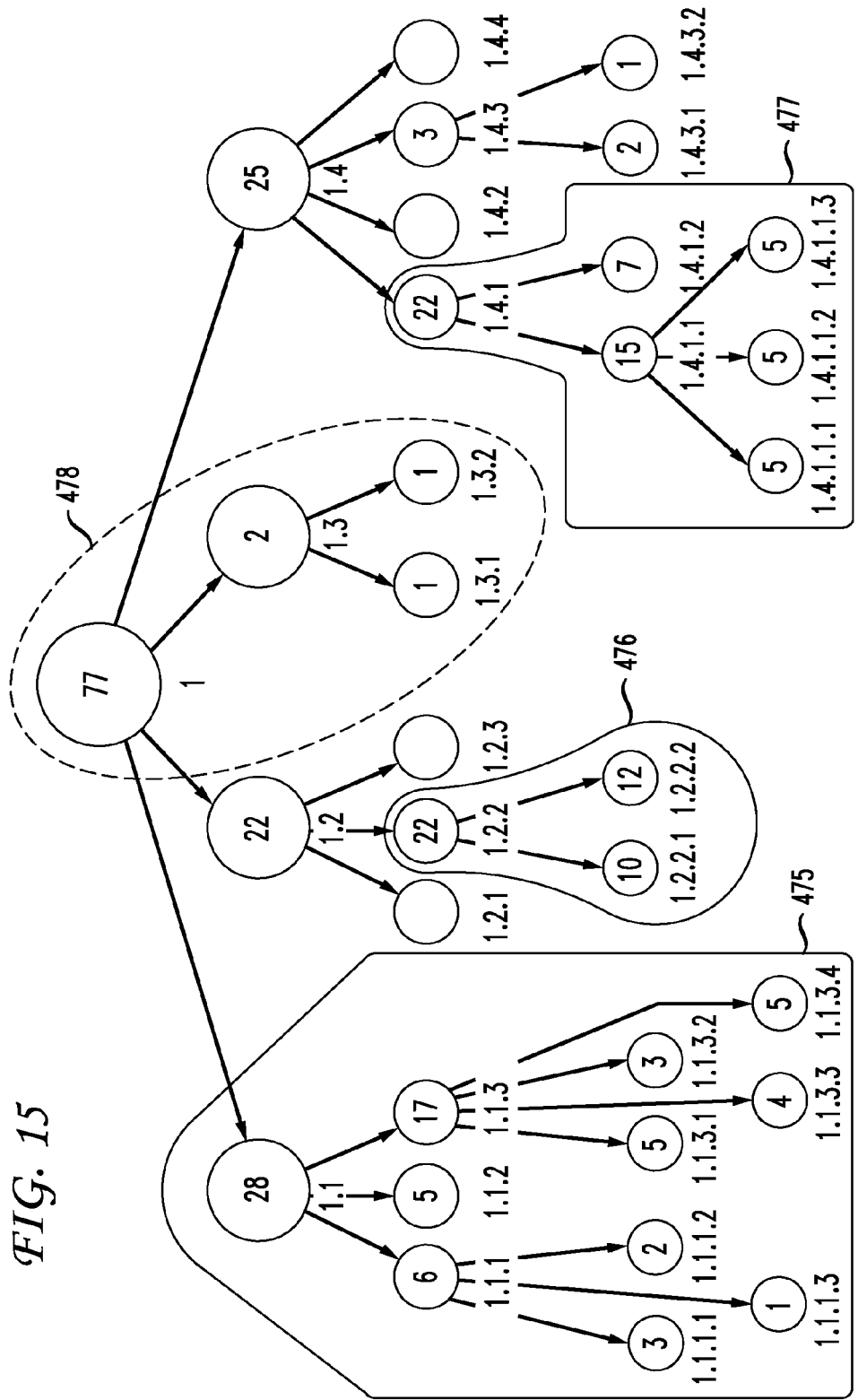
FIG. 15 illustrates an exemplary method of generating participant clusters.

A program participant's media library can be mapped to the server clusters by finding each media item in a program participant's media library in a lowest-level server cluster in the tree and working up the tree of clusters until a participant cluster having at least a determined number of items is accumulated. This method is illustrated in FIG. 14. FIG. 15 illustrates a program participant's library mapped to a tree of server clusters labeled according to hierarchy. The tree represents the same relationship as the entire server cluster tree structure, but the clusters are shown illustrating the number of a program participant's media items that are in any one of those server clusters (clusters without any numbers within them do not contain any of the program participant's media items).

A program participant's media items are mapped to the lowest level server clusters (470). See, for example FIG. 15, server cluster 1.1.1.1 contains 3 of the program participant's items. Table 1, below identifies the number of a program participant's media items in the lowest-level child clusters.

TABLE 1

| Cluster Id | Number of Program Participant's Media Items |
| --- | --- |
| 1.1.1.1 | 3 |
| 1.1.1.2 | 2 |
| 1.1.1.3 | 1 |
| 1.1.3.1 | 5 |
| 1.1.3.2 | 3 |
| 1.1.3.3 | 4 |
| 1.1.3.4 | 5 |
| 1.2.2.1 | 10 |
| 1.2.2.2 | 12 |
| 1.3.1 | 1 |
| 1.3.2 | 1 |
| 1.4.1.1.1 | 5 |
| 1.4.1.1.2 | 5 |
| 1.4.1.1.3 | 5 |
| 1.4.3.1 | 2 |
| 1.4.3.2 | 1 |

Returning to FIG. 14, the process determines if the cluster contains more than a determined number of items. In some embodiments the determined number of items can be 10 or greater, 20 or greater or 50 or greater. In some embodiments the size of the cluster can also be limited to a determined maximum. For the purposes of the present example the determined number of items is 20 or greater. Thus at 471 the process determines that server cluster 1.1.1.1 contains less than 20 items and proceeds to 472 and adds media items from other participant clusters into a common parent. Since cluster 1.1.1.1 shares a common parent with clusters 1.1.1.2 and 1.1.1.3 containing 2 and 1 of the program participant's media items respectively, these media items are merged into one larger participant cluster. Again the process checks the number of media items in the participant cluster and since only 6 items are present in the cluster the process repeats (472). This time, server clusters 1.1.1, 1.1.2 and 1.1.3 all share a common parent and by merging these clusters a participant cluster of 28 media items results. Now when the process checks for a determined number of items (473), the participant cluster exceeds 19 and the process ends 474. The cluster is designated as 475 in FIG. 15.

As discussed above, this process of grouping similar items together by merging clusters higher in the tree is called agglomeration.

FIG. 15 illustrates several other potential outcomes of the process illustrated in FIG. 14. For example participant cluster 476 only required one iteration to have agglomerated a sufficient number of items. Cluster 477 illustrates that the lowest level of the tree diagram for every branch will not necessarily be the same. Cluster 477 began at a $5^{th}$ order server cluster and merged all $5^{th}$ and $4^{th}$ order server clusters into the same parent to result in participant cluster 477.

478 illustrates a failed cluster. In order to agglomerate enough items to achieve the desired size, 478 would need to encompass the top order server cluster. In such an instance, it can be concluded that these items to do exhibit sufficient similarity to be combined into a cluster. The cluster could fail because a programming decision has been made to disallow agglomeration beyond a certain level of the tree, or the cluster could fail for now having too many items.

System Overview

Figure 16:
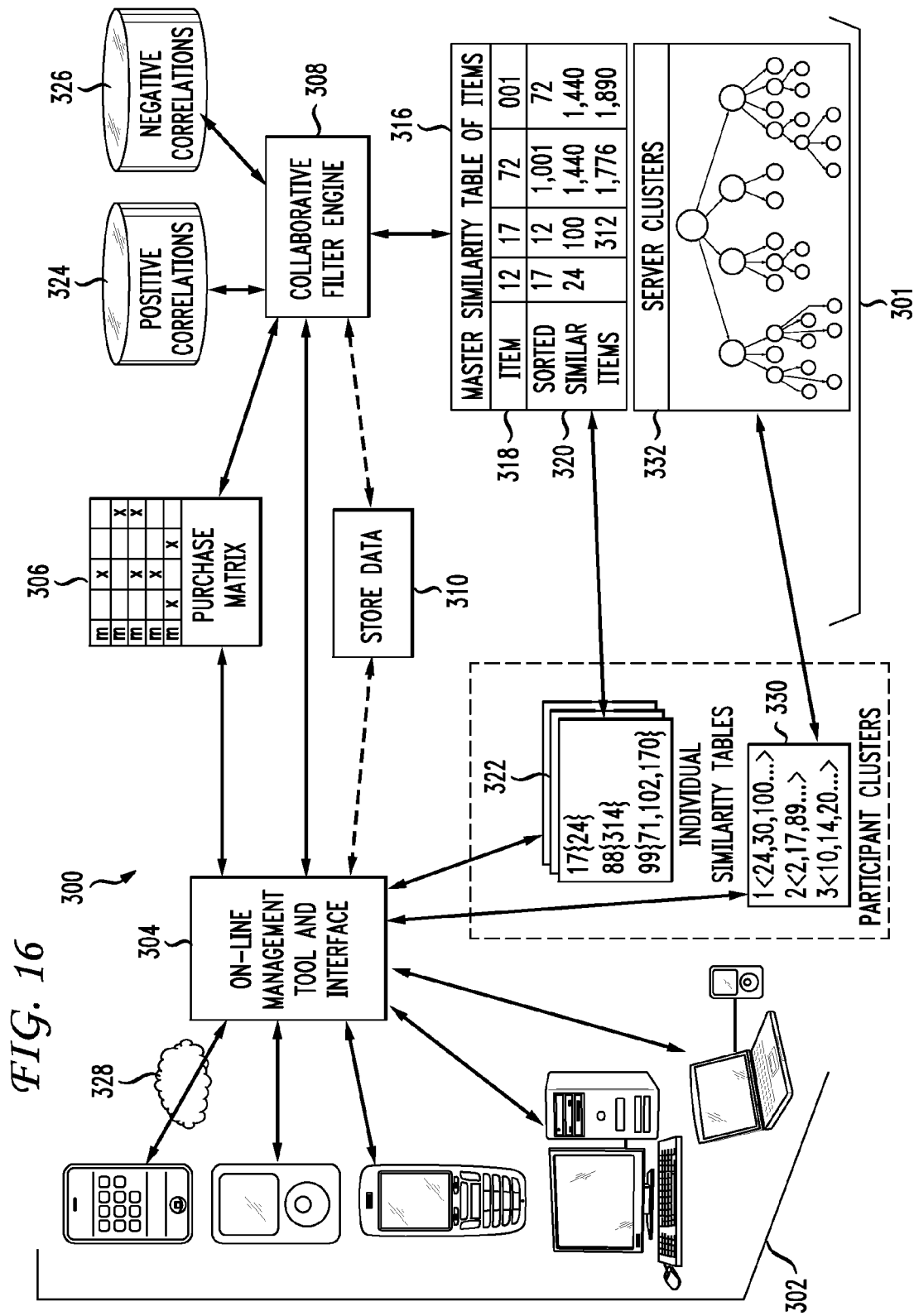
FIG. 16 illustrates an example system embodiment.

FIG. 16 illustrates an example of one such system 300 that can carry out the embodiments described above. Purchase Matrix 306 stores data regarding all media items from each user's library. The collaborative filter engine 308 uses the data in the purchase matrix 306 to determine the incidence of co-occurrence of each media item relative to each of the others. The collaborative filter engine 308 can optionally use feedback data stored in objects 324 and 326 to adjust similarity scores according to user preference across the population of program participants. The output of the collaborative filter engine is stored in the master similarity table by storing all media items that are deemed similar 320 to a given media item 318. The similar media items 320 can be sorted to be presented in order from the most correlated items to the least correlated.

Likewise, the collaborative filter engine can also process its inputs to divide the database in a tree of server clusters 332. Alternatively, the tree of server clusters 332 can be generated from the data output by the collaborative filter engine. Either data set is appropriate for a clustering analysis.

The online management tool 304 serves as the interface for the client side 302 and the server side 301. In a preferred embodiment, the online management tool 304 can be associated with an online store. In one embodiment, the online store may generate data 310 which can also be used by the collaborative filter engine 308 in generating similarity data. Regardless, the client 302 serves to both upload information regarding the media items stored on a client 302 and to download similarity data and clustering data from the server 301. Similarity data specific to the client may be downloaded through the online management tool 304 directly from the master similarity table 316 to generate an individual similarity table 322 on the client device 302 or the individual similarity table may be generated by the server 301 and downloaded to the client device 302. The client device can also communicate feedback data through the online management tool 304 to the collaborative filter 308 to aid in generating better similarity data.

Similarly, the client device 302 can download clustering information from the server 301. In some embodiments, the server 301 calculates participant clusters for a program participant and sends information identifying the participant clusters and the media items belonging to the participant clusters 330. In some embodiments, the server could send information detailing the presence of each of the program participant's media items in each server cluster and let the client agglomerate the participant clusters.

Client

As is illustrated in FIG. 16, the client device 302 can take any one of a variety of forms. Client devices 302 include devices such as portable digital audio players, portable digital video players, smartphones, desktop and laptop computers, television set top boxes, and any other device capable of playing media. Client devices can include offline portable devices which sync to the online store 304 through a desktop computer or other intermediate device, such as an IPOD digital audio player syncing through a cable connection with a desktop computer, an IPOD TOUCH digital audio player syncing wirelessly through a wireless router, or a smartphone syncing wirelessly through a cellular connection. As is apparent from the discussion above, the client device contains an inventory of a variety of media items. If the user of the client device wishes to benefit from the use of similarity data, the user accesses the service through an online interface. Alternatively, the client device can access the similarity data service through a client based application such as the ITUNES desktop application which communicates with a remote server via the Internet.

The online store 304 can be a single server or a cluster of servers which allow client devices to purchase digital media. The online store may also grant access to other ancillary media management features.

Figure 17:
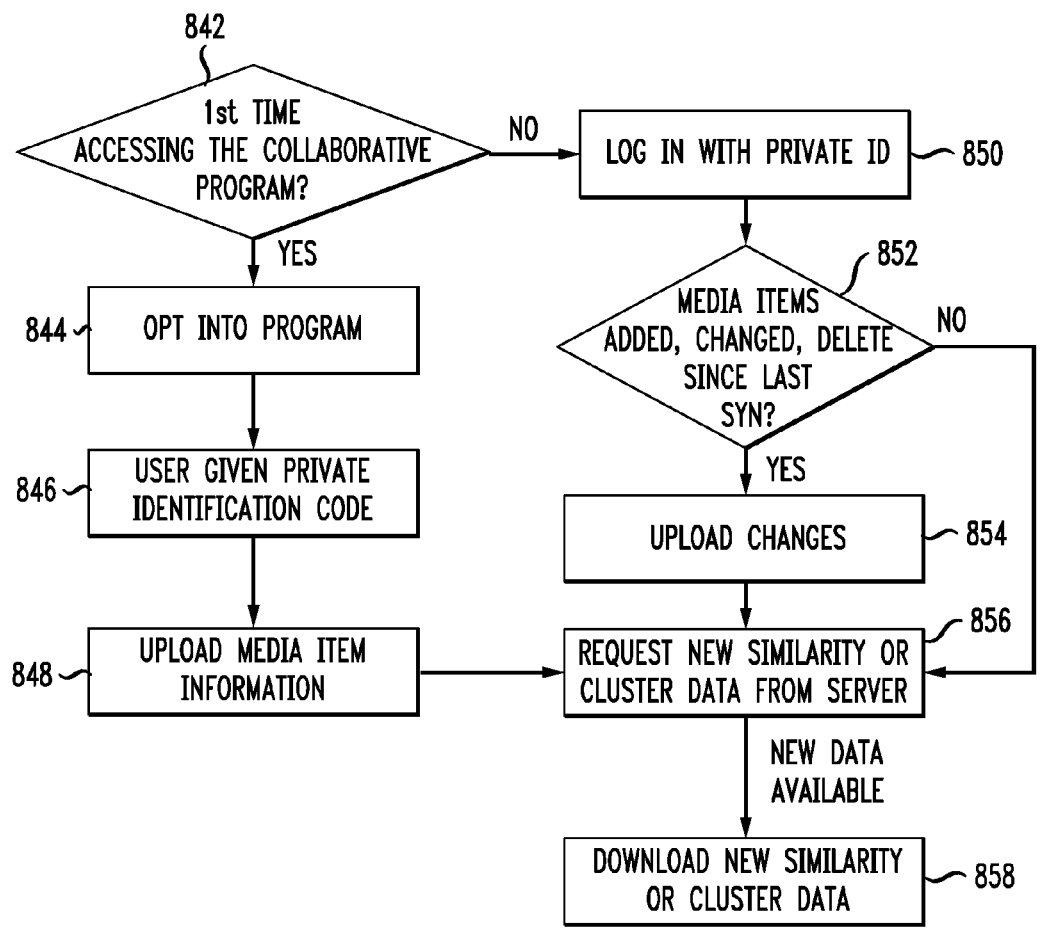
FIG. 17 illustrates an exemplary method of receiving similarity data.

FIG. 17 illustrates a method embodiment for downloading similarity data to the client. If this is the client's first time accessing the collaborative program 842, then the client must choose to participate by opting into the program 844. The client is given a private user identification code at step 846. While the server will use this code to associate with the client's library, only the client contains additional identifying information. The server knows no personal or identifying information regarding either the client device or the user (program participant). Once the private identification code has been assigned, the client device can upload information regarding its media library 848. In some embodiments, a user may select which media items to share with the server.

If the outcome of step 842 indicates that the user is already a participant in the collaborative program, the client can log into the server using its private identification code in step 850. In step 852, the server may request information from the client regarding changes to the media library or alternatively the client may share this information without first being requested. If changes to the library have occurred, the client uploads information regarding the changes 854. Changes can take the form of edited metadata, new items, deleted items, etc. Once up-to-date information regarding the client's media library has been sent to the server, the client can request new similarity and/or cluster data (collectively "participant data") from the server in step 856. Alternatively, the server may initiate the transmission of new or updated participant data.

In some embodiments the client can skip the above steps and simply request updated results from the master similarity table without the need to identify the library. For example, the client can request an update for a particular item or list of items without identifying itself by identification number and without notifying the server of changes to the client's media library inventory.

Similarity data and/or cluster data is downloaded in step 858. Similarity data can be downloaded in the form of a table previously created by the server or the information can be downloaded and formatted into an individual similarity data table in real time. Cluster data can be downloaded as a list of clusters and media items belonging to the cluster. The data can be provided in the same or separate data structures or transmissions.

Playlists are generated based on the individual similarity tables. The playlists can be generated at the client side 302, in the online store 304, or in the collaborative filter engine 308. Playlists can be generated based on the statistical similarity to one song or multiple songs. When a client device employs playlists based on individual similarity tables, certain songs may not be what the user expected or may not be pleasing to the user. When a user often skips a song that is put in the playlist based on statistical similarity, the system "penalizes" the song, reduces its similarity value, includes it in playlists less frequently, and can eventually discard it entirely from playlisting. This is effectuated by reporting when a user skips a song. That act is recorded on the client device and transmitted as feedback to the online store. The online store sends this feedback to the collaborative filter engine which stores it in a negative correlations table 326. The negative correlations table stores negative indications of similarity. In this manner each user does not need to individually skip a song many times before it is rejected from the similarity table. The cumulative negative feedback will filter out unpopular songs for the group of users based on group behavior. As such, these playlists act as living organisms which evolve to suit the changing media tastes of the population of users.

For example, if many users always skip a particular song in a playlist or if many users delete the song from their playlists, that information is recorded and assigned a weight to influence the generation of the master similarity table. The weight may be based on the number of negative correlations reported or on other aspects of user interaction. Conversely, positive user interactions with a particular song provide positive correlations. For example, if many users add the same song to an existing playlist or if many users turn the volume up during a particular song, those positive correlations are reported through the online interface to the server and are stored in a positive correlations table.

In addition to interacting with the server, the client may also interact with other clients or peripheral devices. In one preferred embodiment, the client can be a personal computer which interacts with a portable music player such as an IPOD portable music player. In such an instance the client device can also prepare individual similarity tables for use on the peripheral device. Just as the server can prepare an individual similarity table for a client containing information for only those media items in the client's library, the client can prepare an individual similarity table for the peripheral device containing information for only those media items in the peripheral device's library. The client can load the individual similarity table onto the peripheral device just as it would any other data item.

Peripheral Device

The peripheral device is meant to work with the client just as the client works with the server. For example, the peripheral device can notify the client of changes to its contents and request similarity data for those contents. In a more preferred embodiment, the peripheral device can be managed by the client just as a personal computer running the ITUNES desktop application manages an IPOD portable media device. In this embodiment, the client usually does not need to be updated with changes to the peripheral device's contents because the client already knows the changes by being the tool that effected those changes. In this embodiment the client can also keep the peripheral device's similarity table up-to-date based on the available data in the client's individual similarity table. Further, the peripheral device can communicate feedback data to the client for later transmission to the server.

Again, cluster data can be sent to the peripheral device in a similar manner as to how the similarity data is updated. The client can send a cluster ID along with only media items present on the peripheral device.

In some embodiments, the peripheral device can interact directly with the server as a client device itself. As more and more portable media players have capabilities for accessing the internet, the portable device could interact directly with the server to download the most up-to-date similarity data or to update the master purchase matrix. In such an embodiment the peripheral device could have all the capabilities of the client.

Generating Playlists

Figure 18:
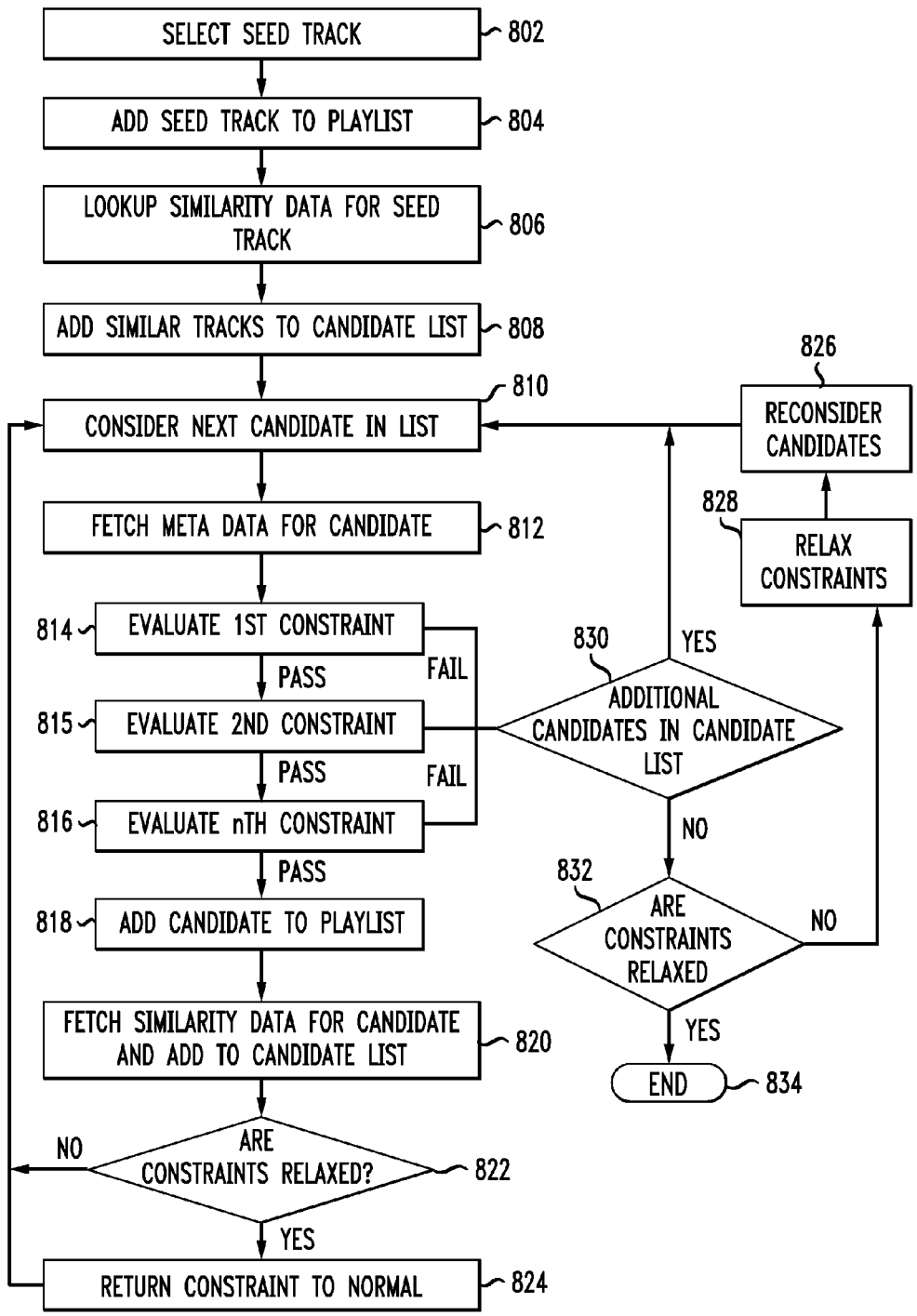
FIG. 18 illustrate an example playlist method embodiment.

As has been discussed, one use of the similarity data generated by the methods described herein would be to use similarity data to generate playlists. While generating playlists can be as simple as playing all similar items in the individual similarity table, the best results will likely be obtained through the use of a playlist generation module. FIG. 18 demonstrates a method embodiment for the generation of a playlist. At step 802 one or more seed tracks are selected and are added to the playlist at step 804. In step 806 the similarity data for the seed track(s) is looked up in an individual similarity table and the similar tracks are added to a candidate list in step 808. Candidates are a list of potential tracks to be added to the playlist. Whether a candidate is added to the playlist is determined by evaluating the candidate against a series of constraints.

Constraints serve as limits on whether a song can be added to a playlist. In most cases the constraints will serve to enhance the quality of the playlist. One constraint may require certain spacing in the playlist. For example, two songs by Radiohead could not play back-to-back if the artist spacing constraint were active. In a similar example, constraints may prevent songs from the same album or song title from occurring within a given number of songs of each other in a playlist. Another constraint would prevent songs from non-compatible genres from playing in the same playlist. Still yet another could be a "jitter" function. Jitter can randomly prevent a song that would otherwise be acceptable from being added to the playlist. Jitter provides randomness to a playlist to prevent the same playlist from being generated every time based the selection of the same seed track. Still yet another constraint could be a skip count constraint wherein any song that has been skipped more than a given number of times would fail the constraint and not be included in the playlist.

It should be appreciated that the constraints are dependent on certain parameters or variables that can be easily varied. For example, the required number of intervening songs between two songs from the same album or artist can be varied. Similarly, the number of skip counts needed to exclude a track or the members of compatible genres can be varied. In one embodiment, such variable settings can be configured by the user. In another embodiment, such settings are chosen by and issue from the server and may be adjusted by the server whenever the client connects to download updated similarity data.

It should also be appreciated that positive constraints are also contemplated. Songs with high play rates or high ratings can be moved up in the playlist or can be immune to the jitter function or effects of some other negative constraint. Many variations are possible by adding more restraints, removing constraints, making constraints more or less strict, each of which is contemplated by the method described herein.

In step 810 the next candidate to be considered is selected and its metadata is retrieved in step 812. The metadata provides information about the candidate that will be needed in evaluating the constraints. In steps 814, 815, and 816 the track is evaluated by the constraints. While only three constraints are represented in FIG. 18, it is contemplated that there can be any number of possible constraints. If the song passes one constraint, it is passed to the next constraint until all constraints are passed in step 818 and the track is added to the playlist. Thereafter the method proceeds to step 820 and fetches similarity data for the new song in the playlist. That similarity data can be appended to the candidate list for consideration for inclusion in the playlist.

If a track fails a constraint the method skips to step 830 and returns to step 810 if there are additional candidates in the list to evaluate. However, if there are no additional candidates in the list, meaning that all candidates either failed the constraints or are in the playlist, step 832 checks the constraints to determine if they are set to their default value. If they are, the constraints are relaxed at step 828 in the hope that relaxing one or more of the constraints will allow a previously rejected candidate to be added to the playlist upon reconsideration at step 826. If all candidates once again fail the constraints, step 832 determines that the constraints were already relaxed and ends the process.

Relaxing constraints can take any one of a variety of forms. In some cases only one constraint becomes less strict. In other cases multiple constraints are relaxed. For example, if the first constraint requires that two songs from the same artist do not play within 4 songs of each other, the constraint can be relaxed to only require one intervening song or the constraint can be eliminated entirely. In some embodiments, not all constraints can be relaxed. An example is the genre constraint. Certain genres may never be compatible and thus the genre constraint would not be relaxed to include additional genres.

Returning to step 826, in the instance where the candidate track failed the constraints and no additional candidates are available, the constraints are relaxed. If, due to the relaxed constraints, a candidate passes all constraints and is added to the playlist, the constraints are returned to normal at steps 822 and 824. Step 822 checks the constraints to determine if they are relaxed or are at their default settings. If they are at their default settings, the method returns to step 810 and considers the next track in the list. If, however, step 822 determines the constraints are relaxed, the method proceeds to step 824 which returns the constraints to normal and then returns to step 810 to consider the next candidate in the list. This process continues until no candidate passes the relaxed constraints and the routine ends at step 834.

Songs need not be added to a playlist in order of the most similar to least similar; songs can be added in any order using a randomization algorithm or other logic.

Generated playlists can be static or dynamic. Dynamic playlists can be updated over time as the similarity data evolves and as new items are added to a user's library. Alternatively, when a playlist is generated that a user enjoys and wants to retain without change, the user can save the playlist as a separate, static playlist which is no longer influenced by the similarity data. In this manner, when users feel that a particular generated playlist is "perfect", it can be preserved unsullied from the changing tastes of the masses reflected in the similarity table through the server.

Mixes from Participant Clusters

The participant clusters are useful in generating mixes of media items. As an exemplary embodiment, the mixes can be music media item mixes.

As discussed above, a client device downloads information regarding the clusters contained within the program participant's media library. While any number of clusters can exist, in some embodiments it is desired to only keep track of a limited number of clusters, for example twelve. Since each of the clusters includes media items that do not overlap with any other cluster, each cluster will represent different collections of similar media items. The result is that each of the twelve clusters can represent different types of music. A program participant might be in the mood to listen to their classical media items, or their popular media items and the clusters can create mixes from these collections.

Figure 19:
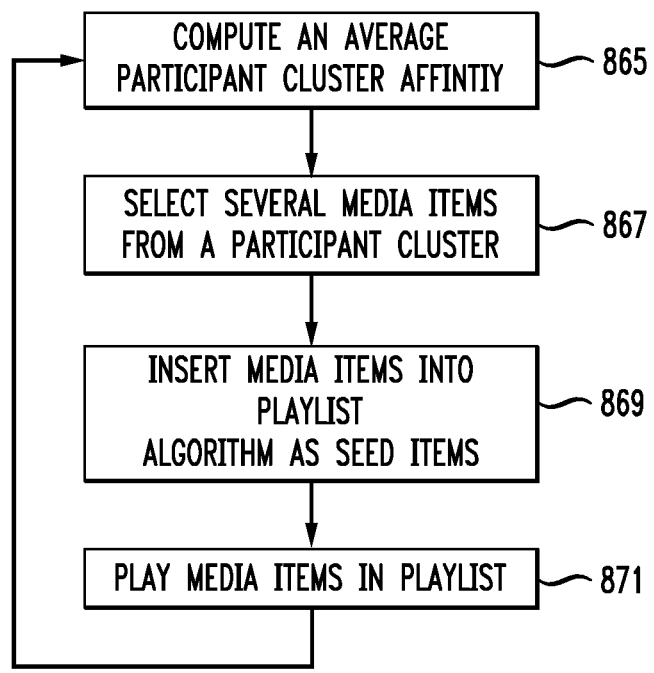
FIG. 19 illustrates an example media mix method embodiment.

FIG. 19 illustrates the basic method for generating the mixes. Since the mixes are intended to be a representation of media items within the program participant's media library that are similar, an average similarity or affinity for the cluster is calculated 865. This can be done in a number of different ways including taking an average of all similarity vectors for the media items represented in a cluster. The average vector will represent the average affinity of the media items for the cluster. An alternative method is to choose a media item for which the similarity scores of the other media items with respect to the chosen media items are strongly similar and use that media item as a representative media item for the cluster.

The process can then select several songs (without any user involvement) from the cluster. Ideally, these items will have an approximately average similarity score to the cluster average so that the seed songs are representative of the cluster. In some embodiments it is desired to avoid selecting the most strongly correlated or the most weakly correlated items to the cluster. But, in some embodiments, the most strongly correlated items can be selected. And in some embodiments the selection of the several media items can be a random selection of media items from within the cluster.

The selected media items 867 are input into a playlist algorithm 869 such as the one described above. Each of the selected items constitutes a seed track for the playlist algorithm. Since the playlist module will lookup similar items 808, 820 for all items in the playlist to use as candidates for inclusion into the playlist, the playlist may eventually include media items outside the cluster. Once the playlist is created, it is played 871 until the program participant discontinues playback. As illustrated in FIG. 19, once the playlist has reached its end, the process continues so that the mix is endless. The result will be that media items that are generally similar to the other items in the selected cluster will continuously play.

Uses of Similarity Data for Syncing Devices

Just as playlists can be generated, similarity data can also be used to keep a peripheral device such as a portable music player updated with new or different music from the user's media library. Many portable media players suffer from limited capacity and thus not all of a user's media library can be stored on a portable device such as an IPOD portable media player. In such instances users often must select a portion of their media items to be stored on their portable device. Some user's may consider this process burdensome and may find that they get tired of the media items that are currently stored on their portable device.

One solution to the problem identified above is to use similarity data to keep the portable device updated with new media items. In this embodiment a user selects a certain number of seed tracks that represent the type of music that they would like on their portable device. Just as a playlist can be generated from seed tracks, so too can data items from a user's library be chosen for inclusion on a portable media player. As similarity data changes, and as new songs are added to a user's library, similarity data can be used to keep the portable device up-to-date with new tracks.

Purchase Recommendations

Similarity data can also be used to recommend new items for purchase by a user. Items that occur in the master similarity table, but are not present in the user's library can be recommended for purchase by the system. In one embodiment the online store can make purchase recommendations based on the user's library or the selection of a seed track. The online store can also recommend items for purchase using recent purchases as the seed track. In another embodiment the playlist module can recommend songs for purchase by informing the user of where the song would have been included in the playlist if it were part of the user's library. Purchase recommendations can occur at any level of the system from the server to the client to the portable media player.

Similarly, items in a sever cluster that are not owned by a program participant can be suggested for purchase to the program participant.

In some embodiments, the item to be recommended can be a new item that does not yet have similarity data associated with it. In such a scenario, a similarity score can be provided by an administrator of the online store so that the new item will be recommended for purchase by users. The provided similarity score can remain until similarity data based on co-occurrence or other embodiments is available.

Similarly, movie rentals or purchases could also be recommended. While most of the embodiments have been described with respect to songs, media items can also be any file including videos or movies. In this embodiment, a user can request similar movies based on the selection of a seed item. Alternatively, the system can recommend movies based on previous rentals. It is even contemplated that similarity data can be used to automatically download new movies to a client or portable media player for the user's viewing at a later time. This embodiment could be part of a subscribed service or the user could choose to not watch the movie and not-incur a rental fee.

Figure 20:
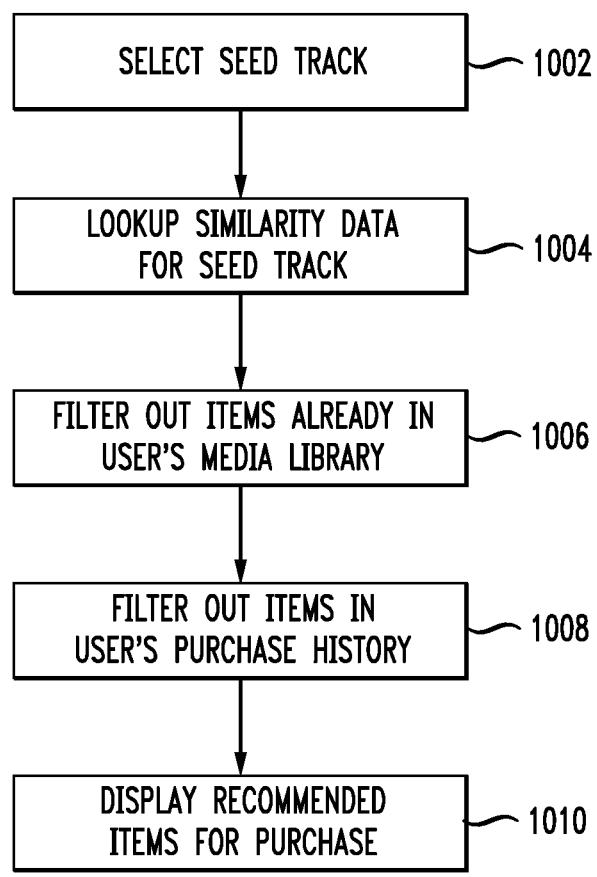
FIG. 20 illustrates an exemplary method embodiment for recommending items for purchase.

FIG. 20 illustrates one method embodiment in which similarity data can be used for recommending media items for purchase. In step 1002, a seed track is selected. Purchase recommendations are based off of a seed track, just as playlists are generated based on a seed track. However, in at least one embodiment, purchase recommendations can be based on content most similar to a user's entire library.

Once a seed track is selected, the illustrated method next looks up similarity data for that seed track from the individual similarity table in step 1004. In this embodiment, it will be appreciated that the individual similarity table will also contain media items that are not in the user's library, but are related by similarity data to items that are present in the user's media library. In another embodiment, the purchase recommendation can come directly from the server, rather than the locally stored similarity table. Similarity lists from the master similarity table can provide similarity data and the server or client can subtract out the tracks identified from the user's library. This embodiment has the benefit of generating the smallest possible individual similarity tables, since purchase recommendations do not need to be included, and all users share the master table for recommendation purposes.

To prevent the items that are already in a user's library from being recommended for purchase, step 1006 filters items that are already in the user's media library from the similarity data retrieved in step 1004. In some cases media items have already been purchased by a user, but those items are not in the user's media library. This could be for any number of reasons such as: the user did not like the song and deleted it, or the user has stored the media item in another library, or the user may have purchased the media item but has not downloaded it yet. In at least these scenarios it would not be desirable to recommend these media items for purchase, so they too are filtered out in step 1008. Step 1010 displays the recommended items for purchase.

Of course, the method can repeat for every song that is currently selected by the user. In some embodiments, the user need not affirmatively seek purchase recommendations. In such embodiments, purchase recommendations can be displayed within a media organizer or media store whenever a media item is selected for playback. As the media item is played, a graphical user interface can display other recommended media items, or groups of media items, such as albums, for purchase. In a preferred embodiment, the media items can be purchased directly by selecting, with an input device, the recommendation itself, or at least the recommendation can hyperlink to an online store so that the media item can be purchased therefrom.

In another embodiment, purchase recommendations can also be shown using this methodology where a selection is not available. For example, in a View An Artist page which would display top songs by a designated artist that listeners have also bought, the system can display recommendations that are filtered to eliminate recommendations of items already in the user's library.

Server>Client>Ipod

Figure 21:
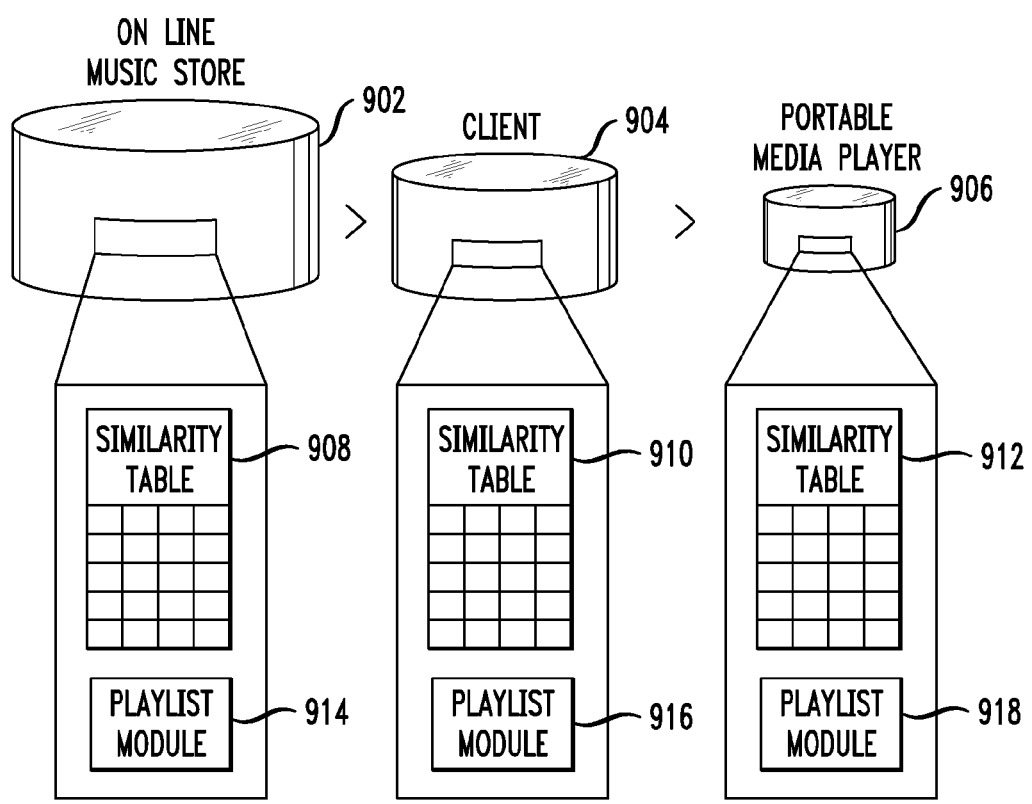
FIG. 21 illustrates an example system embodiment.

In one particularly preferred embodiment, the methods that are useful at one location are equally applicable at each location in the system. FIG. 21 illustrates this concept. An online music store 902 is shown containing a similarity table 908 and a playlist module 914. The similarity table 908 contains all of the relationships for each item in the server's media inventory. The playlist module 914 operates based on the data in the similarity table just as it would on any other client or portable media player in the system. Likewise, the client 904 is shown containing a smaller media inventory than the server contains and similarity data for each item in the client's media inventory is stored in its similarity table 910. Playlist module 916 operates based on the data in the local similarity table 910 just as it would on the portable media player 906 or music store 902. Finally, portable media player 906 is shown containing a smaller media inventory than that of the client 904. The similarity table 912 stores information relevant to items in the portable media player's 906 media inventory and the playlist module 918 operates based on that data.

FIG. 21 illustrates the concept that the client can behave like a server to a group of portable media players or a larger client can behave as a server to smaller clients; all of which is contemplated herein.

In most embodiments, the server will be the only location maintaining the master purchase matrix and master similarity table, but the generation of local similarity tables can occur on any device based on the data derived from the server. Another function that will likely be carried out by the server is updating. Not only will the server be the source of similarity data updates in most embodiments, but the server can also update the playlist module or software components of the system.

It will be appreciated that not all processes described herein must occur in real time. In many cases it will be desirable to save processing resources and carry out certain tasks offline. For example, the collaboration filter engine may run only at scheduled times to generate the master similarity data table. It is further conceived that the need for offline processing may be relieved as technology advances. In such instances, those processes that are now preferred to be carried out offline could be carried out in real time.

In another embodiment, although each device is capable of carrying out certain functions locally, it may be desirable to have the server carry out specified tasks. For example, the server could generate individual similarity tables for the client or generate playlists for the client. This may be of greater use for the client to carry out these tasks for the portable media player which typically lacks the processing resources desired for large processes. In another example, it might be beneficial for the server to carry out some of the constraints used in playlist generation and incorporate the results in the similarity table data. For example, in the case of a genre constraint which will never be relaxed, the server may exclude media items from a non-compatible genre from an item's similarity data. In this way, the playlist module will not need to run the constraint when generating a playlist because the server would have already excluded items that would not pass the constraint from the individual similarity table.

Figure 22:
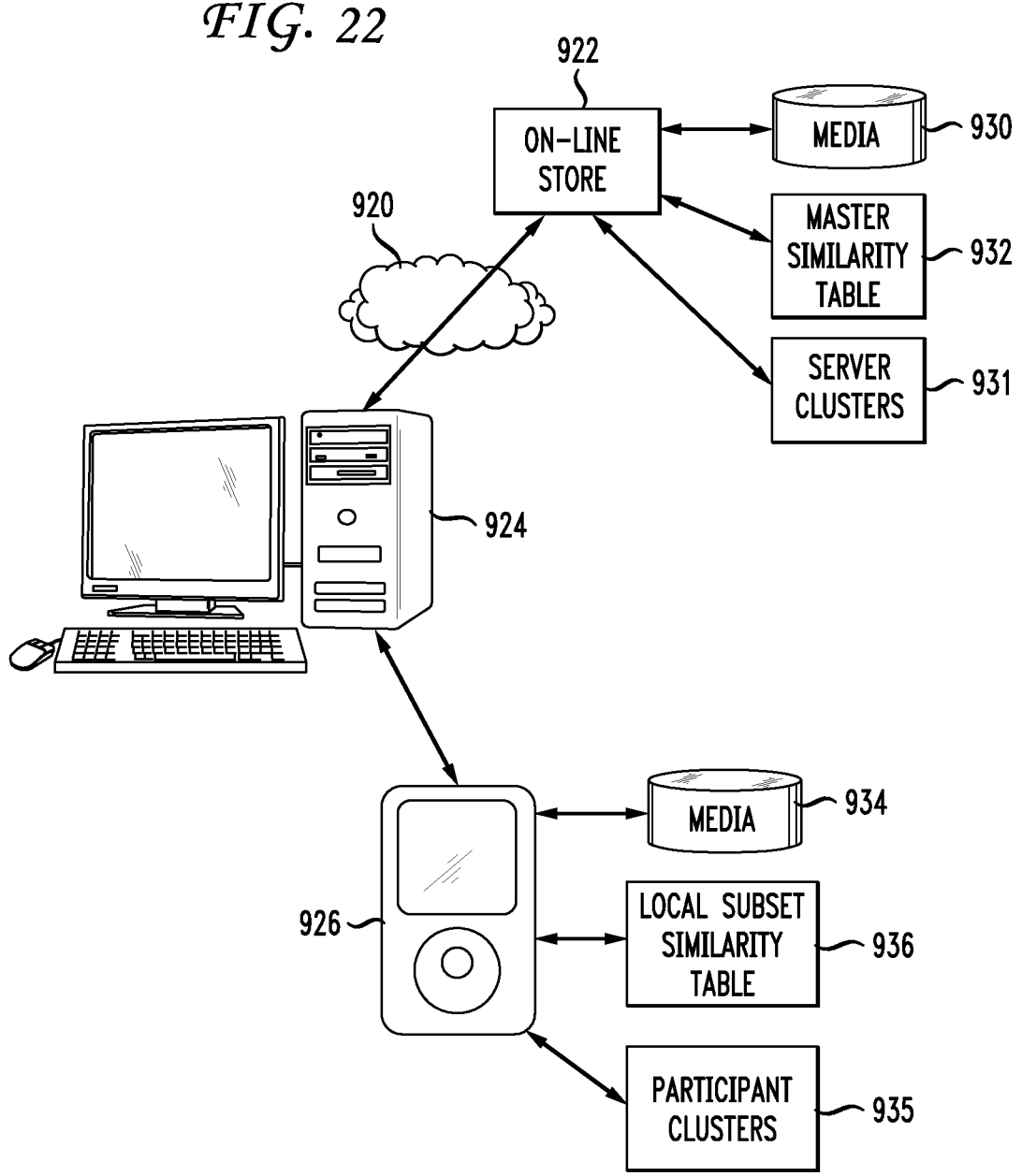
FIG. 22 illustrates an example system for synching media and similarity tables to a digital media player.

FIG. 22 illustrates an example system for syncing media and similarity tables to a digital media player. The communication medium 920 is most likely to be the Internet, but can include any channel(s) allowing devices to communicate with each other. The online store 922 communicates with a client 924, typically a personal computer, with special software installed to communicate and interact with the online store. A portable media player 926, such as an Apple IPOD media player, typically syncs via a 30-pin USB connector with a personal computer 924 connected to the online store 922. Other ways to connect a portable media player 926 to a personal computer 924 include USB, Firewire, 802.11 series or Bluetooth wireless connections. The online store has a master library of media 930, a master similarity table 932, and a tree of server clusters 931. When the portable media player 926 is synced, the local media 934 metadata and the local subset similarity table 936 and participant server clusters 935 are transmitted through the personal computer 924 and the communication medium 920 to the online store 922. It is important to note that only metadata is transmitted, not the actual media. The online store does not need a copy of the media, it only needs sufficient information to positively identify which media are located on the portable media player 926. The online store is able to generate and/or retrieve the appropriate information and send it back to the device, updating the local subset similarity table 936 and participant clusters 935 with fresh data corresponding to the locally stored media 934. The local subset similarity table is then used to generate individualized playlists at the online store level, the computer level, and/or on the device itself.

In another embodiment the portable media player 926 can obtain data directly from the server 922. In such an embodiment the portable media player can be equipped with various capabilities for connecting to the online store such as through 802.11 series communications (Wi-Fi) or through a mobile telephone network. The portable media player can connect directly to a server and perform just as a client device would in the example above. The portable media can be assigned a unique identification number, or if the library is also associated with a client device, the portable media player can use the same identification number as would the client device. Regardless, the portable media player can upload information about media items stored in its library and download similarity data about those same items. It should be appreciated that the portable media player can have more than one method of connecting to the server. Not only can the portable media player have multiple mechanisms for connecting to an online store, but the portable media player can also have capabilities to synchronize with a client device and communicate directly with the online store.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a network cloud 328 (shown in FIG. 16) such as a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to an online store accessible wirelessly by a portable media playback device or by a personal computer physically connected to a network. Those skilled in the art will readily recognize various modifications and changes that may be made to the present invention without following the example embodiments and applications illustrated and described herein, and without departing from the true spirit and scope of the present disclosure.

The invention claimed is:

1. A computer implemented method for clustering similar media items in a program participant's media library comprising:

selecting, by a processor, a collection of media items from a server library of content items available to the processor, the collection of media items selected based on the contents of at least one program participant's media library of a population of program participants;

dividing, by the processor, the collection of media items into canopies comprising respective groups of potentially similar media items;

recursively sub-dividing, by the processor, the media items in each canopy, each recursion producing non-overlapping, increasingly refined, server clusters of media items determined to be similar to other media items in a respective server cluster based on a cluster analysis of similarity data derived from the population of program participants;

terminating, by the processor, the recursive sub-dividing responsive to determining that the server clusters produced from the latest recursion each comprise no more than a determined number of media items, resulting in a plurality of lowest-level server clusters; and creating, by the processor, one or more participant media item clusters for a particular program participant from media items present in that program participant's media library, comprising:

grouping, by the processor, media items found in that program participant's media library into participant media item clusters, the media items found in that program participant's library grouped according to the grouping of media items in the lowest-level server clusters; and recursively agglomerating, by the processor, the participant media item clusters based on the server clusters, wherein participant media item clusters grouped according to lowest-level server clusters that share a common parent server cluster, and which have fewer than a participant cluster minimum number of media items, are agglomerated into respective larger participant media item clusters until each of those larger participant media item clusters comprises at least the participant cluster minimum number of media items.

2. The method of claim 1, wherein the canopies divide the program participants' collective media library inventories into groupings based on editorial data from which it can be concluded that media items in different groupings can never be considered similar.

3. The method of claim 2, wherein the editorial data comprises genre information.

4. The method of claim 1, wherein the cluster analysis comprises a k-means analysis.

5. The method of claim 1, wherein the media items in each canopy are grouped by artist before the cluster analysis.

6. The method of claim 1, wherein the determined number of media items in a lowest-level server cluster is 1000 or less.

7. The method of claim 1, wherein the determined number of media items in a lowest-level server cluster is 100 or less.

8. The method of claim 1, wherein the determined number of media items in a lowest-level server cluster is 50 or less.

9. The method of claim 1, wherein the participant cluster minimum number of media items comprising is equal to or greater than 20 items.

10. The method of claim 1, wherein the participant cluster minimum number of media items comprising a participant cluster is equal to or greater than 50 items.

11. The method of claim 1, wherein the similarity data derived from the population of program participants comprises a vector space, wherein each vector within the vector space represents a media item and all media items similar to the media item.

12. The method of claim 1, wherein the similarity data derived from the population of program participants comprises a similarity matrix representing incidences of co-occurrences of an individual media items in among program participants' media libraries.

13. A system comprising:
a processor; and
a memory containing instructions that, when executed, cause the processor to:
select a collection of media items from a server library of content items available to the processor, the collection of media items selected based on the contents of at least one program participant's media library of a population of program participants;
divide the collection of media items into canopies comprising respective groups of potentially similar media items;
recursively sub-divide the media items in each canopy, each recursion producing non-overlapping, increasingly refined, server clusters of media items determined to be similar to other media items in a respective server cluster based on a cluster analysis of similarity data derived from the population of program participants;
terminate the recursive sub-dividing responsive to determining that the server clusters produced from the latest recursion each comprise no more than a determined number of media items, resulting in a plurality of lowest-level server clusters; and
create one or more participant media item clusters for a particular program participant from media items present in that program participant's media library, comprising:
grouping media items found in that program participant's media library into participant media item clusters, the media items found in that program participant's library grouped according to the grouping of media items in the lowest-level server clusters; and
recursively agglomerating, by the processor, the participant media item clusters based on the server clusters, wherein participant media item clusters grouped according to lowest-level server clusters that share a common parent server cluster, and which have fewer than a participant cluster minimum number of media items, are agglomerated into respective larger participant media item clusters until each of those larger participant media item clusters comprises at least the participant cluster minimum number of media items.

14. The system of claim 13, wherein the system is part of a server array.

15. The system of claim 13, wherein the canopies divide the program participants' collective media library inventories into groupings based on editorial data from which it can be concluded that media items in different groupings can never be considered similar.

16. The system of claim 13, wherein the similarity data derived from the population of program participants comprises a vector space, wherein each vector within the vector space represents a media item and all media items similar to the media item.

17. The system of claim 13, wherein the similarity data derived from the population of program participants comprises a similarity matrix representing incidences of co-occurrences of an individual media items in among program participants' media libraries.

18. A non-transitory computer-readable medium containing instructions that, when executed by a computing device, cause the computing device to:
select a collection of media items from a server library of content items available to the computing device, the collection of media items selected based on the contents of at least one program participant's media library of a population of program participants;
divide the collection of media items into canopies comprising respective groups of potentially similar media items;
recursively sub-divide the media items in each canopy, each recursion producing non-overlapping, increasingly refined, server clusters of media items determined to be similar to other media items in a respective server cluster based on a cluster analysis of similarity data derived from the population of program participants;
terminate the recursive sub-dividing responsive to determining that the server clusters produced from the latest recursion each comprise no more than a determined number of media items, resulting in a plurality of lowest-level server clusters; and
create one or more participant media item clusters for a particular program participant from media items present in that program participant's media library, comprising:
group media items found in that program participant's media library into participant media item clusters, the media items found in that program participant's library grouped according to the grouping of media items in the lowest-level server clusters; and
recursively agglomerate the participant media item clusters based on the server clusters, wherein participant media item clusters grouped according to lowest-level server clusters that share a common parent server cluster, and which have fewer than a participant cluster minimum number of media items, are agglomerated into respective larger participant media item clusters until each of those larger participant media item clusters comprises at least the participant cluster minimum number of media items.

19. The non-transitory computer-readable medium of claim 18, wherein media items in different canopies cannot be divided into the same server cluster.

20. The non-transitory computer-readable medium of claim 18, wherein the canopies are determined based on editorial data.

21. The non-transitory computer-readable medium of claim 20, wherein the editorial data comprises genre information.

22. The non-transitory computer-readable medium of claim 18, wherein the cluster analysis comprises a k-means analysis.

23. The non-transitory computer-readable medium of claim 18, wherein the similarity data derived from the population of program participants comprises a vector space, wherein each vector within the vector space represents occurrences of an individual media item in each program participant's media library.

24. The non-transitory computer-readable medium of claim 18, wherein the similarity data derived from the population of program participants comprises a similarity matrix representing incidences of co-occurrences of an individual media items in among program participants' media libraries.

* * * * *